US008793348B2

(12) United States Patent
Ott

(10) Patent No.: US 8,793,348 B2
(45) Date of Patent: Jul. 29, 2014

(54) PROCESS FOR INSTALLING SOFTWARE APPLICATION AND PLATFORM OPERATING SYSTEM

(75) Inventor: Joerg Ott, Eisenach (DE)

(73) Assignee: Group Business Software AG, Eisenach (DE)

( * ) Notice: Subject to any disclaimer, the term of this patent is extended or adjusted under 35 U.S.C. 154(b) by 128 days.

(21) Appl. No.: 12/884,873

(22) Filed: Sep. 17, 2010

(65) Prior Publication Data

US 2011/0072505 A1 Mar. 24, 2011

Related U.S. Application Data

(60) Provisional application No. 61/243,759, filed on Sep. 18, 2009.

(51) Int. Cl.
*G06F 21/20* (2006.01)
*G06F 15/177* (2006.01)

(52) U.S. Cl.
USPC .......................................... 709/220; 709/222

(58) Field of Classification Search
None
See application file for complete search history.

(56) References Cited

U.S. PATENT DOCUMENTS

| | | | | |
|---|---|---|---|---|
| 6,938,079 | B1 * | 8/2005 | Anderson et al. | 709/222 |
| 7,577,722 | B1 * | 8/2009 | Khandekar et al. | 709/220 |
| 2006/0149830 | A1 * | 7/2006 | Bellinger et al. | 709/217 |
| 2007/0198721 | A1 * | 8/2007 | Ikawa et al. | 709/226 |
| 2008/0086735 | A1 | 4/2008 | Cheenath et al. | |
| 2009/0271472 | A1 * | 10/2009 | Scheifler et al. | 709/202 |
| 2010/0169491 | A1 * | 7/2010 | Martin | 709/226 |
| 2010/0332456 | A1 * | 12/2010 | Prahlad et al. | 707/664 |

FOREIGN PATENT DOCUMENTS

| | | | |
|---|---|---|---|
| EP | 2 339 463 | A1 | 6/2011 |
| WO | 02/03220 | A2 | 1/2002 |
| WO | 2009/018489 | A2 | 2/2009 |

OTHER PUBLICATIONS

Tremain, Method and Appartus for Providing Computer Services, Oct. 1, 2002, WO 02/03220A2.*
"IEEE Standards for Local and Metropolitan Area Networks: Virtual Bridged Local Area Networks", Mar. 8, 1999, Std 802.1Q1998, The Institute of Electrical and Electronics Engineers, Inc.
iQ.Suite from GROUP Business Software AG, "A secure, fully scalable, rules-based email messaging-management suite," created Nov. 2010, 2 pages.
iQ.Suite WebCrypt from GROUP Business Software AG, "Email encryption made easy," 2011, 13 pages.

(Continued)

*Primary Examiner* — Hassan Phillips
*Assistant Examiner* — Omeed D Rahgozar
(74) *Attorney, Agent, or Firm* — Houston & Associates, LLP

(57) ABSTRACT

A process for installing a software application on a platform, the platform comprises several servers including one or more application servers and a control server on which a platform configuration database is installed. The process comprises the following steps after a predefined software application is selected by an user: reading out configuration data and solution data from the platform configuration database wherein the registration data describes the platform configuration and the solution data describes a solution of the selected software application which is registered on the platform, determining the virtual server(s) which is needed to run the selected software application, creating the determined virtual server(s) on the platform, installing an instance of the selected software application in the created virtual server(s), connecting the instance to an interface of the platform to provide an access for listeners to the instance.

19 Claims, 20 Drawing Sheets

(56) References Cited

OTHER PUBLICATIONS

Email security without compromise, Confidential email communication for your company from GROUP Business Software AG, created Jun. 2010, 8 pages.
Virtualizing IBM Lotus Domino 8.5.1 on VMware vSphere 4: Functional and Performance Test Results, Feb. 2011, 34 pages.
Leonardo W Caldas, Gustavo S Ferreira: Administering IBM Lotus Domino, 8.5 servers for beginners; Mar. 2010, 80 pages.
iQ.Suite WebCrypt from GROUP Business Software AG, "Email encryption made easy," 2011, 4 pages.
Email Management Solution Guide from GROUP Business Software AG, created Nov. 2010, 36 pages.

* cited by examiner

```
<EventDataParser xmlns:xsi="http://www.w3.org/2001/XMLSchemainstance"
xmlns:xsd="http://www.w3.org/2001/XMLSchema">

<ValidationKey>20090909133734835125T+02:00_FUu21szoUkvZv4rUCM0Q2t1mCY=</ValidationKey
>
 <TestMode>false</TestMode>
 <NewObj>
  <DataObjectType>New</DataObjectType>
  <AccountSolutionRelation>
   <id>42</id>
   <accountID>10627</accountID>
   <solutionID>75</solutionID>
   <partnerAccountID>0</partnerAccountID>
   <status>Live</status>
   <fromDatetime>20090909T1527:39.32</fromDatetime>
   <toDatetime>20091009T15:27:39.32</toDatetime>
   <trial>true</trial>
   <subscriptionStatus>None</subscriptionStatus>
   <subscriptionReason />
   <attemptKey>bd318258dc394a2f9f098f8ca369d5c0</attemptKey>
   <account>
    <status>Live</status>
    <id>10627</id>
    <configID>0eb509b0ec77418980190acec0d8afbb2</configID>
    <active>true</active>
    <isSystem>false</isSystem>
    <isPartner>false</isPartner>
    <isCustomer>true</isCustomer>
    <partnerID>0</partnerID>
    <accountName>cspat</accountName>
    <abbreviation>cspat</abbreviation>
    <accountNameForHost>cspat</accountNameForHost>
    <accountCategory />
    <companyID>0</companyID>
    <companyType />
    <companyStatus />
    <phone />
    <fax />
    <email>csp@cloud.as</email>
    <internetDomain />
    <website />
    <viaPartner />
    <noOfEmployess>0</noOfEmployess>
    <addressLine1>.</addressLine1>
    <addressLine2 />
    <addressLine3 />
    <zip>.</zip>
    <city>.</city>
    <state />
    <country>.</country>
    <notesServer />
```

FIG. 8

```
  <notesPath />
  <ERPSystem />
  <comments />
  <contactPesonUserID>0</contactPersonUserID>
  <solutions />
  <parentAccountID>0</parentAccountID>
  <ownNetworksAllowed>false</ownNetworksAllowed>
  <ownSolutionsAllowed>false</ownSolutionsAllowed>
  <subTypes />
  <accountNameIdent />
  <hasChilds>false</hasChilds>
  <contactPersonSummary />
  <types_html />
</account>
<solution>
  <id>75</id>
  <name>WebCrypt</name>
  <abbreviation>WebCrypt</abbreviation>
  <secureID>WebCrypt</secureID>
  <enabled>true</enabled>
  <accountID>0</accountID>
  <partnerAccountID>0</partnerAccountID>
  <creatorAccountID>10610</creatorAccountID>
  <creatorAbbreviation />
  <calculatedTitle> WebCrypt</calculatedTitle>
  <guid>00000000000000000000000000000000</guid>
  <doEventsWhenSettingsHasBeenChanged>false</doEventsWhenSettingsHasBeenChanged>
  <subscriptionExists>false</subscriptionExists>
  <subScriptionFromDatetime>20090909T15:37:34.803875+02:00</subScriptionFromDatetime>
  <subScriptionToDatetime>20090909T15:37:34.803875+02:00</subScriptionToDatetime>
  <subScriptionTrial>false</subScriptionTrial>
  <hadSubScriptionTrial>false</hadSubScriptionTrial>
  <subscriptionStatus>None</subscriptionStatus>
  <subscriptionReason />
  <expiredState>None</expiredState>
  <solutionSettingDetailLevel>User</solutionSettingDetailLevel>
  <userGroupSettingDetailLevel>User</userGroupSettingDetailLevel>
  <asrStatus>Live</asrStatus>
  <users />
  <hasRelatedDocuments>false</hasRelatedDocuments>
  <maxASREventsFiredAtOnce>1</maxASREventsFiredAtOnce>
  <maxUSREventsFiredAtOnce>1</maxUSREventsFiredAtOnce>
  <name_html>WebCrypt</name_html>
</solution>
<machines>
  <VLAN_Machine current="false">
    <id>472</id>
```

FIG. 8 (continued)

```
 <guid>3c7f41de23484fb4a4fe179e4f5939e3</guid>
<customID>a6c0424f255f9843a14bc11a745596b4</customID>
<vlanID>375</vlanID>
<hostname>WebCrypt</hostname>
<ipZoneIndex>2</ipZoneIndex>
<status>Live</status>
<state>Running</state>
<transition>None</transition>
<manageable>false</manageable>
<vlan>
 <id>375</id>
 <name>cspat- WebCrypt</name>
 <accountID>10610</accountID>
 <ipZoneStart>176161232</ipZoneStart>
 <ipZoneMask>4</ipZoneMask>
 <status>Live</status>
 <doDemandMachineBackup>false</doDemandMachineBackup>
 <asrID>0</asrID>
 <manageable>false</manageable>
 <deleted>false</deleted>
 <Mask>255.255.255.252</Mask>
 <SubNet>10.128.1.208</SubNet>
 <Gateway>10.128.1.209</Gateway>
</vlan>
<lstRelations />
<lstPublishingRules>
 <VLAN_Machine_PublishingRule>
  <id>351</id>
  <vlanMachineID>472</vlanMachineID>
  <hostname>cspat.cloudgrouplive.com</hostname>
  <machineIDHost>false</machineIDHost>
  <webAccess>HTTPS</webAccess>
  <webAccessInternal>HTTPS</webAccessInternal>
  <internalHTTPPort>0</internalHTTPPort>
  <internalHTTPSPort>443</internalHTTPSPort>
  <internalFTPPort>0</internalFTPPort>
  <status>Live</status>
  <deleted>false</deleted>
 </VLAN_Machine_PublishingRule>
</lstPublishingRules>
<deleted>false</deleted>
<subnetMask>255.255.255.0</subnetMask>
<hardMemoryMB>2048</hardMemoryMB>
<softMemoryMB>1792</softMemoryMB>
<diskspaceMB>5120</diskspaceMB>
<remoteDesktopSessions>4</remoteDesktopSessions>
<cpu>1000</cpu>
<processes>500</processes>
<virtualizationServerID>2</virtualizationServerID>
<virtualizationServer>
 <id>2</id>
```

FIG. 8 (continued)

```
      <ip>10.1.1.50</ip>
      <type>VirtuozzoLinux_x64</type>
      <webServiceIP>10.1.1.20</webServiceIP>
     </virtualizationServer>
     <asrID>0</asrID>
     <solutionMachineTemplateID>42</solutionMachineTemplateID>
     <allowBackup>true</allowBackup>
     <typeID>7</typeID>
     <IP>10.128.1.210</IP>
    </VLAN_Machine>
   </machines>
   <history>
    <id>42126</id>
    <timestamp>20090909T15:27:39.36</timestamp>
    <userID>28</userID>
    <action>Insert</action>
    <systemTable>AccountSolutionRelation</systemTable>
    <systemIDID>42</systemIDID>
    <comment />
    <user>
     <active>true</active>
     <id>28</id>
     <configID>c751391b68a74ae0bfcd0da390267040</configID>
     <email>system@itf.as</email>
     <username>system</username>
     <password />
     <firstName>system</firstName>
     <lastName>system</lastName>
     <notesAlias />
     <city />
     <country />
     <compPhone />
     <cellPhone />
     <directPhone />
     <fax />
     <status>Live</status>
     <accountID>0</accountID>
     <solutions />
     <firstName_html>system</firstName_html>
     <lastName_html>system</lastName_html>
     <userName_html>system</userName_html>
    </user>
   </history>
   <solutionAdmins />
  </AccountSolutionRelation>
 </NewObj>
 <CallbackGUID>7849f09616 2d407eb178fc321fdc794d</CallbackGUID>
</EventDataParser>
```

FIG. 8 (continued)

PROCESS FOR INSTALLING SOFTWARE APPLICATION AND PLATFORM OPERATING SYSTEM

RELATED APPLICATIONS

This application claims the benefit under 35 USC 119(e) of U.S. Provisional Application No. 61/243,759, filed on Sep. 18, 2009, which is incorporated herein by reference in its entirety.

BACKGROUND OF THE INVENTION

Single tenant software is software which is designed to run on a single server usually in a local area network. It is not possible to install two runtime versions of a single tenant software on one server, as there would be a conflict between the two runtime versions.

If a single tenant software shall be used on a server in a software as a service (SaaS) then the single tenant software has to be rewritten in a multi tenant architecture, so that at least the working data of each user are strictly separated from each other. Advantageously, a plurality of runtime versions (instances) of this software are simultaneously executable on a server, wherein to each instance a separate storage space is assigned to which only the certain instance has access.

It is very labor-intensive to rewrite an existing single tenant software into a multi tenant software.

The software Lotus Domino from IBM Corporation, USA, is a single tenant software. To use this software as a service an instance of this software has to be installed for each customer (tenant) into a server (physical or virtual). The installation of an instance in a server is very cumbersome, because the creation of a server and the installation of the software into the server needs highly skilled personnel and takes long time. Therefore, the software Lotus Domino is only offered as software as a service, by IBM directly, for customers with at least 1.000 users to accommodate for the use of server and manual labour. This software is then installed on a separate physical server for SaaS.

If Lotus Domino were a multi tenant software, several runtime versions could be easily installed on one server for the use of different customers. The software Microsoft Exchange is a multi tenant software, which is offered to users of any size as a software as a service. For small customers with less than 1.000 users Microsoft Exchange is the market leader as for such customers. Lotus Domino is available for customers with less than 1000 users only as a single tenant software for on-site installation.

There are several server operating systems which allow the setup of a virtual server. A virtual server is an isolated software container that can run its own operating system and applications as if it were a physical computer. A virtual server behaves exactly like a physical computer and contains its own virtual (i.e. software-based) CPU, RAM, hard disk and network interface card. Virtual servers are also called virtual machines.

Such server operating systems are e.g. VMware ESXi and Linux xen. There are also software packages which can be run on an ordinary server operating system and which allow the setup of virtual servers. Such a software package is for example Parallels® Virtuozzo Containers from Parallels GmbH, Germany, which can be run on a Windows Server 2003 and Linux.

The automatic setup of virtual servers is disclosed in U.S. Pat. No. 7,577,722 B1. A provisioning server automatically configures a virtual machine according to user specifications and then deploys the virtual machine on a physical host. The user may either chose from a list of pre-configured, ready-to-deploy virtual machines, or he may select which hardware, operating system and application(s) he would like the virtual machine to have. The provisioning server then configures the virtual machine accordingly, if the desired configuration is available, or it applies rules to configure a virtual machine that best matches the users request if it isn't. There are also tools for monitoring the status of virtual machines and hosts, for migrating virtual machines between hosts, and for creating a network of virtual machines.

WO 2009/018489 A2 discloses a software market place and distribution system. A market place application is hosted at one or more servers. A software application can be received from a software vender for distribution. The software application is made available for distribution through the market place application.

WO 02/03220 discloses an apparatus and a method for providing one or more computer services to a plurality of customers. A virtual machine and a virtual network can be configured for each customer. This can be done entirely or semi-automatically.

US 2008/0086735 A1 discloses a method and a system for providing a client access to an external service via an application service platform.

SUMMARY OF THE INVENTION

There is a significant need for a solution to run a plurality of instances of a single tenant software on a server to allow the software as a service.

The present invention relates to a process for installing a software application and/or a platform operating system. Particularly, the present invention relates to a process for installing a software application and a platform operating system the allow the so called software as a service (SaaS), where user can use a certain software running on the platform, wherein the user accesses this software by means of a client computer via a wide area network or public network such as the InterNet.

The object of the present invention is to provide a process for installing a software application, a platform operating system and a system which allow running a plurality of instances of a single tenant software simultaneously on a server.

The object of the present invention is solved by a process for automatically installing a software application on a platform, wherein the platform comprises several servers including one or more application servers and a control server on which a platform configuration database is installed, comprising the following steps after a predefined software application is selected by an user:

- reading out configuration data and solution data from the platform configuration database wherein the configuration data describes the platform configuration and the solution data describes a solution of the selected software application which is registered on the platform,
- determining the virtual server(s) which is/are needed to run the selected software application,
- creating a separate network on the platform comprising a connection to an interface of the platform to a wide area network, —creating the determined virtual server(s) on the platform and connecting the virtual server(s) to said separate network,
- installing an instance of the selected software application in the created virtual server(s), connecting the instance to said interface of the platform to provide an access for listeners to the instance.

The process according to the present inventions creates a computer environment comprising the separate network and the virtual server connected to the separate network which is only provided for running the selected software application. On the platform several computer environments can be created, wherein none of the computer environments has any connection to another computer environment. Therefore, in each computer environment identical installation parameters, e.g. local IP-addresses, identical names of files and directories can be used without causing any conflict. Therefore, it is not necessary to stage a virtual machine as it is known from U.S. Pat. No. 7,577,722 B1.

This allows the use of single tenant software on a server in the same way as a multi tenant software in that each instance of this software is installed in a separate computer environment on one server platform. A plurality of listeners can access this software without causing any data conflict or creating any loss of security. There is no need to change the architecture of the single tenant software.

This process is controlled by a platform operating system which provides to the platform the function of automatically installing instances in virtual servers. This is made possible as the platform operating system maintains and updates a platform configuration database in which at least all relevant information is stored defining the configuration of the platform including the type of installed hardware (e.g. servers, switches, etc.), installed and available software (server operating systems, firewall, software applications, etc.), and user specific data. The automatic maintenance of this data makes it possible to automatically control the installation so that an automatic installation of complete server systems is possible.

The interface of the platform is usually a firewall server on which a firewall is running Connecting the instance to that interface of the platform can be carried out in that in the firewall a port is installed automatically for the selected software application which allows a communication from and to a wide area network, which usually is the internet. The port is usually restricted to the use of predefined users, comprising at least the listeners.

The connecting of the instances is preferably controlled by a control server. This control server can also automatically control the rights for reading, writing and deleting of data in the computer environment of the defined users and listeners.

The automatically connecting of the instance to the interface of the platform makes it possible that the installation of the computer environment and the solution can be initiated from someone who is not the administrator of the server platform but a user and to install the solution in such that it is ready to work.

Connecting of the instance to the interface of the platform means that the settings of the interface, e.g. firewall or mail gateway, have to be changed. This is a job which was typically reserved to highly skilled administrators. This is a highly sensitive part of the server platform, as it allows the access from outside. As the solution data comprise all necessary information about the solution and the listeners of the solution the inventors realized that also this process step can be automated and that both the solution and the listeners are exactly defined the data communication is clearly limited. Furthermore, the listeners have only access to “their” computer environment which is separated from all other computer environments and does not provide any access to the other parts of the server platform. Thus the automatic connecting of the instance to the interface does due to the special computer environment not cause any additional risk.

This process can be used very advantageously in a load balancing routine which is running on a platform to balance the computational load of the individual physical servers. The process for installing a software application allows automatically installing and duplicating virtual servers. As the job of a virtual server on a first physical server can be taken over from a duplicated virtual server on a second physical server the virtual server on the first physical server can be shut down without any interruption of the corresponding service to the listener. Thus it is possible to move virtual servers in the platform from one physical server to another physical server. So the virtual servers can be automatically rearranged on the physical servers of a platform. This makes it possible that physical servers can be automatically started up and shut down according to the demanded computational load. Therewith it is possible to run a platform with only the amount of actually needed physical servers. If more computation power is needed then it is possible to start up new servers and to automatically install instances in new virtual servers. For the installation of a new virtual server and the corresponding instance only some minutes are needed.

The system comprises a platform with one or more physical servers and the platform operating system (POS) comprising the function of automatically creating a virtual server when a new instance is installed on the platform.

A platform configuration database (PCD) is an internal database of the platform operating system which can be accessed only by the platform operating system.

A software application is any coded software in source code or runtime-code which may be in a single or a multi tenant architecture.

An instance is an executable runtime version of a software application which is stored in the main storage of a computer.

A solution comprises one or more software applications which are registered on the platform together with all necessary settings to run the software application on the platform.

A user is someone who administrates and/or initiates on behalf of someone else the installation of a solution and/or an instance on the platform.

A listener is a user who is using an instance on the platform.

A platform operating system according to the present invention comprises a platform configuration database and several routines for carrying out a process for automatically installing a software application on a platform, wherein the platform comprises several servers including one or more application servers and a control server on which a platform configuration database is installed, comprising the following steps after a predefined software application is selected by an user:

reading out configuration data and solution data from the platform configuration database wherein the registration data describes the platform configuration and the solution data describes a solution of the selected software application which is registered on the platform, determining the virtual server(s) which is needed to run the selected software application, creating a separate network on the platform comprising a connection to an interface of the platform to a wide area network, creating the determined virtual server(s) on the platform and connecting the virtual server(s) to said separate network, installing an instance of the selected software application in the created virtual server(s), connecting the instance to said interface of the platform to provide an access for listeners to the instance.

The platform operating system can be made available stored on a computer readable data carrier or by means of a download.

A platform according to the invention comprises several servers including one or more application servers and a control server, wherein said above mentioned platform operating system is installed on the platform to control the platform.

The creation of a separate network on the platform can be carried out by means of installing a virtual network according to IEEE standard for Virtual Bridged Local Area Networks (IEEE Std 802.1Q1998), or by establishing VPN-connections, by routing or by another virtual network as provided e.g. from the company Parallels.

The platform comprises preferably a communication unit for carrying out the communication between the user and the platform and in which certain functions are defined and the user can only use these functions.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 8 shows an XML-file for a web-service.

DETAILED DESCRIPTION OF THE PREFERRED EMBODIMENTS

Figure 1:
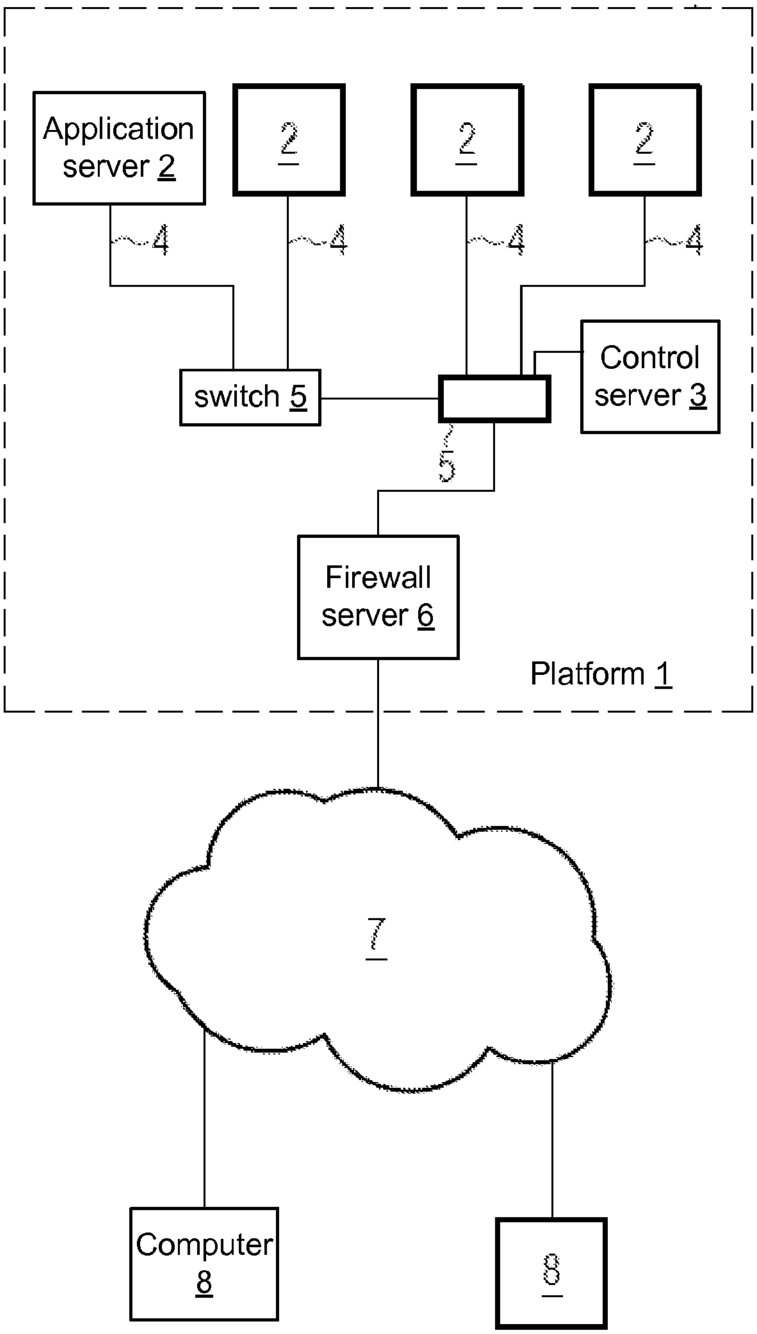
FIG. 1 is a block diagram showing schematically the physical components of a platform which is connected to the internet.

The platform 1 comprises several application servers 2 and at least one control server 3 (FIG. 1). The application servers 2 are provided for hosting the instances which can be accessed by the listeners. The application servers 2 can run with different server operating systems.

The control server 3 controls the basic functions of the platform and comprises the main parts of the platform operating system which is described below in more detail. The servers 2, 3 are connected via data lines 4 with one or more switches 5.

A firewall server 6 is connected by means of a further data line 4 also to one of the switches 5.

Each server 2, 3, 6 comprises a hardware interface for being connected to the data lines 4. These hardware interfaces, the data lines 4 and the switches 5 form a physical network.

The depicted embodiment according to FIG. 1 comprises several physical servers 2, 3, 6. In other embodiments, only a single physical server is used, on which the application servers, control server and firewall server are installed as virtual servers. As a rule it is preferable that a platform comprises a plurality of physical servers e.g. 10 to 100 physical servers or even more.

On each application server 2 a server operating system is installed which allows creating virtual servers. Such server operating systems are VMware ESXi and Linux xen. There are also software packages which can be run on an ordinary server operating system and which allow the setup of virtual servers. Such a software package is for example Parallels® Virtuozzo Containers from Parallels GmbH, Germany.

It is possible that in the platform 1 on different physical servers different server operating systems are installed.

On the firewall server 6, firewall software is installed through which a data connection to a wide area network (WAN) is provided. The wide area network 7 is typically the internet but it can be also any other kind of network. Client computers 8 are connected to the wide area network 7 so that a data communication between the platform 1 and the client computers 8 can be established. The client computers 8 are used by the listeners to access an instance installed on the platform 1.

A main part of the platform operating system is a platform configuration database 9. The platform configuration database comprises several tables 10 for

- configuration data of the platform,
- user information,
- which user(s) can provide which solution(s),
- which user(s) has installed which solution(s),
- listener information,
- data about installed solutions,
- event data,
- solution settings,
- user settings,
- software applications,
- server operating systems data,
- etc.

The table for configuration data of the platform of the platform configuration database 9 comprises configuration details of all servers of the platform 1.

The table for server operating systems data comprises information which operating systems are installed on the different physical application servers 2.

The table for user information comprises user specific data. This user specific data comprise e.g. the name, the rights of users, and identification data of users and further user specific data.

The table for software applications comprises data which software applications are registered and where the corresponding files are stored.

Some of these tables contain data describing the configuration of the platform. These data are called configuration data. Some of the tables contain data describing the solutions of the platform. These data are called solution data.

Figure 2:
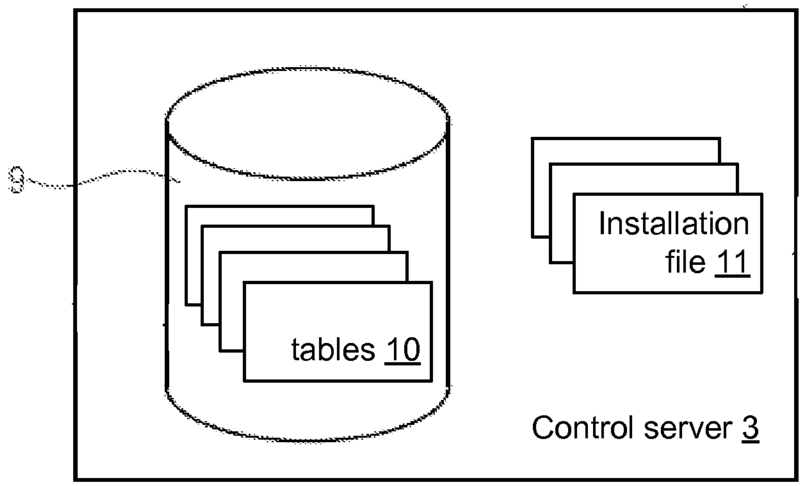
FIG. 2 is a block diagram showing schematically a control server on which basic elements of the platform operating system are installed.

Installation files 11 (msi-files or rpm-files) for certain software applications are stored on the control server 3 (FIG. 2).

The platform operating system comprises a plurality of routines for registering a new software application, for creating a new instance and for further purposes.

The platform operating system comprises a function for registering of software applications.

For registering of a new software application the following steps have to be carried out:

The user of the platform has to sign up the platform.

Figure 6A:
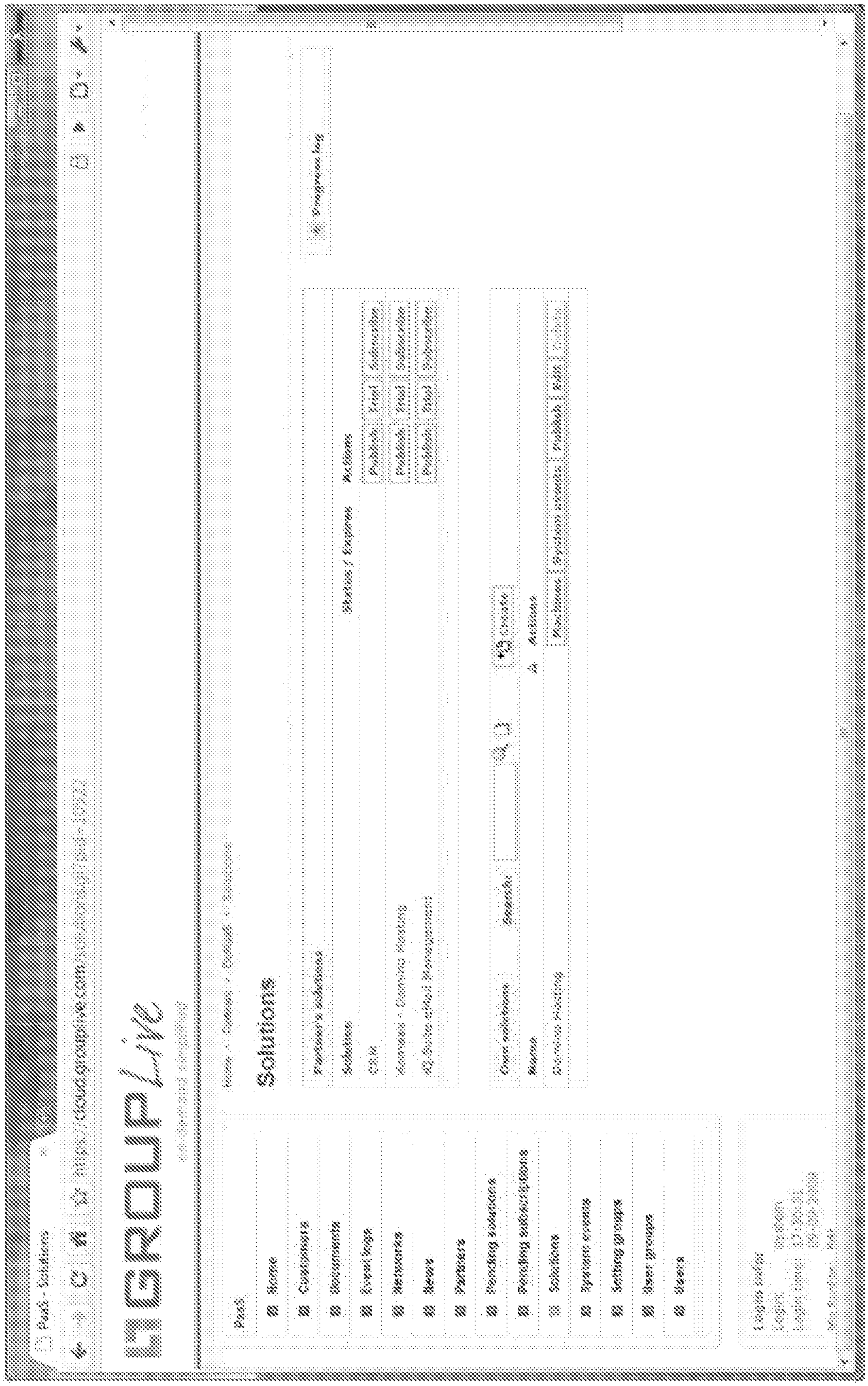
FIG. 6*a*-6*g* are screenshots of an embodiment of the present invention.
Figure 6B:
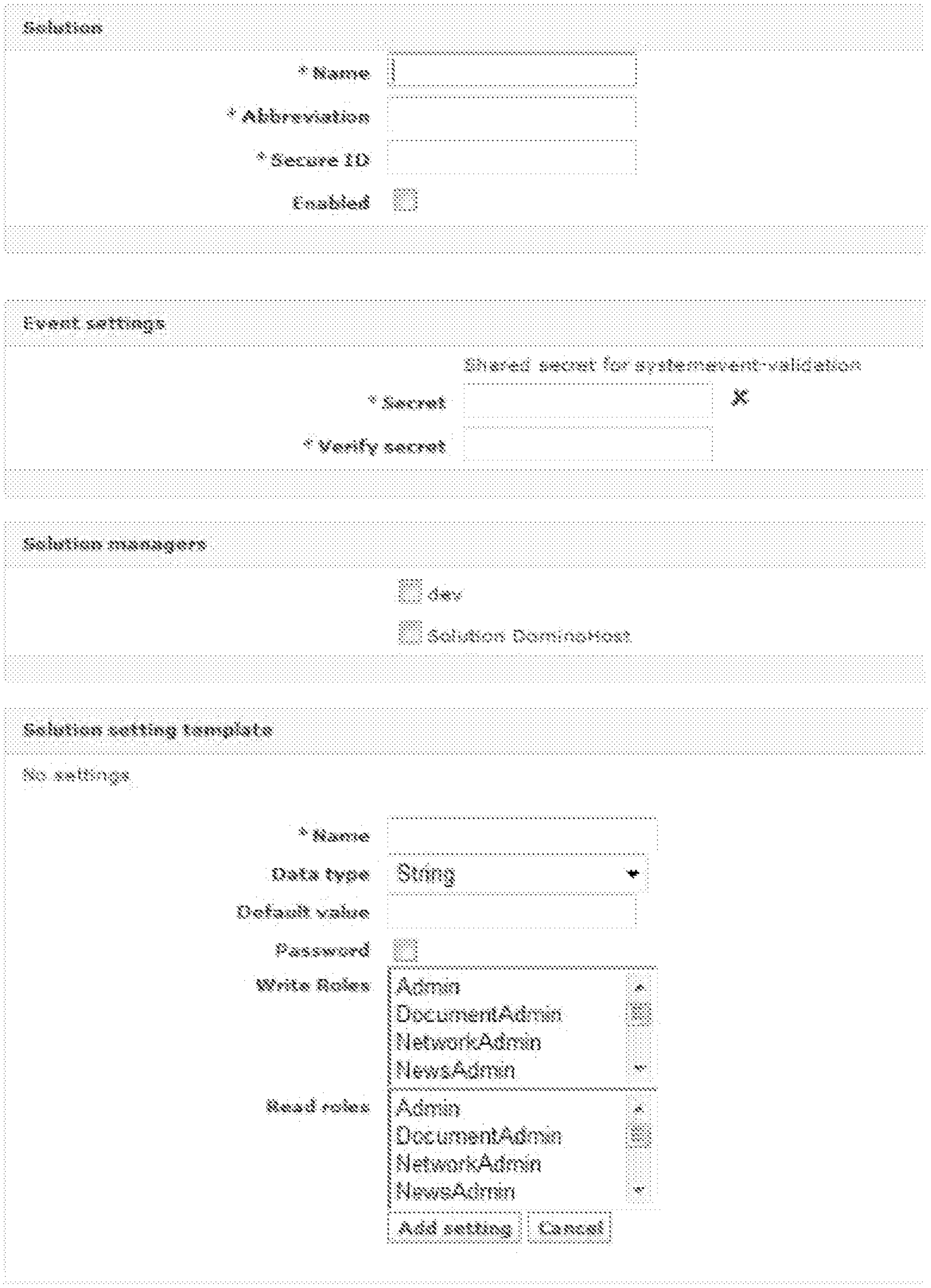

He can create a new solution by entering a new name in the corresponding menu of the platform operating system. In the menu "solutions" (FIG. 6*a*) new names can be entered after clicking the button "Create" (FIG. 6*b*). The new name is in the enclosed example "Domino Hosting". When a new name for a new solution is entered the user is asked for a secure-ID and a password. The secure-ID and the password are used by the platform operating system to communicate with the specific solution.

During registration of a new software application optionally settings can be defined. The menus for defining these settings can be entered in the menu "solutions" by clicking on the buttons "machines", "system events", "publish" and "edit". The term "machine" on the button "machine" stands for "virtual server".

Figure 6C:
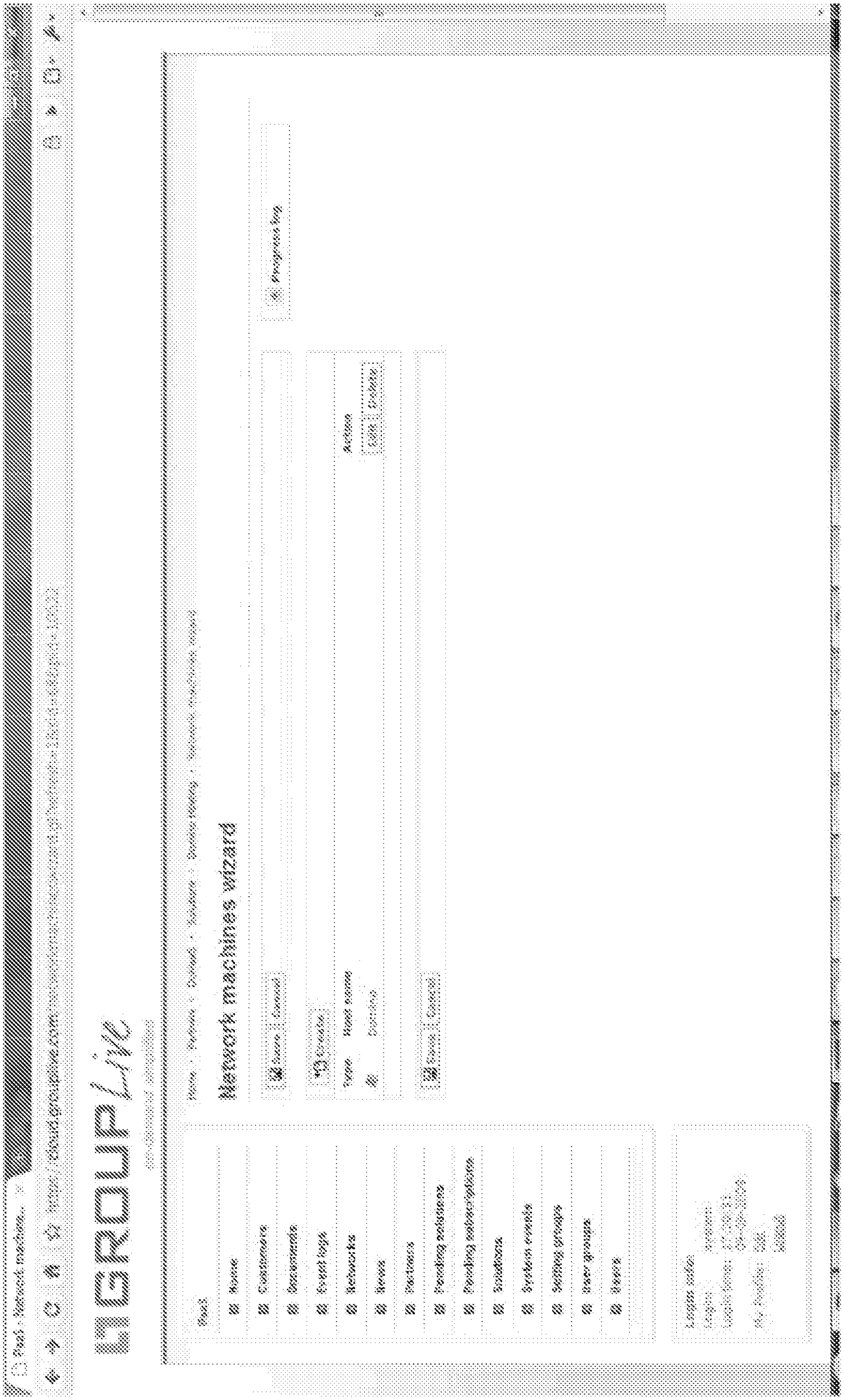

A click on the button "machines" opens the menu "network machines wizard" in which a list of virtual servers for running the solution is given (FIG. 6*c*).

A click on the button "Create" or "Edit" opens a sub-menu in "network machine wizard" comprising several sliders, namely "general", "management", "software", "publishing", and "file execution" for defining the settings of each individual virtual servers. The button "Create" allows entering a new name of a virtual server, wherein with the button "Edit" the same menu is opened for editing an already existing server.

Figure 6D:
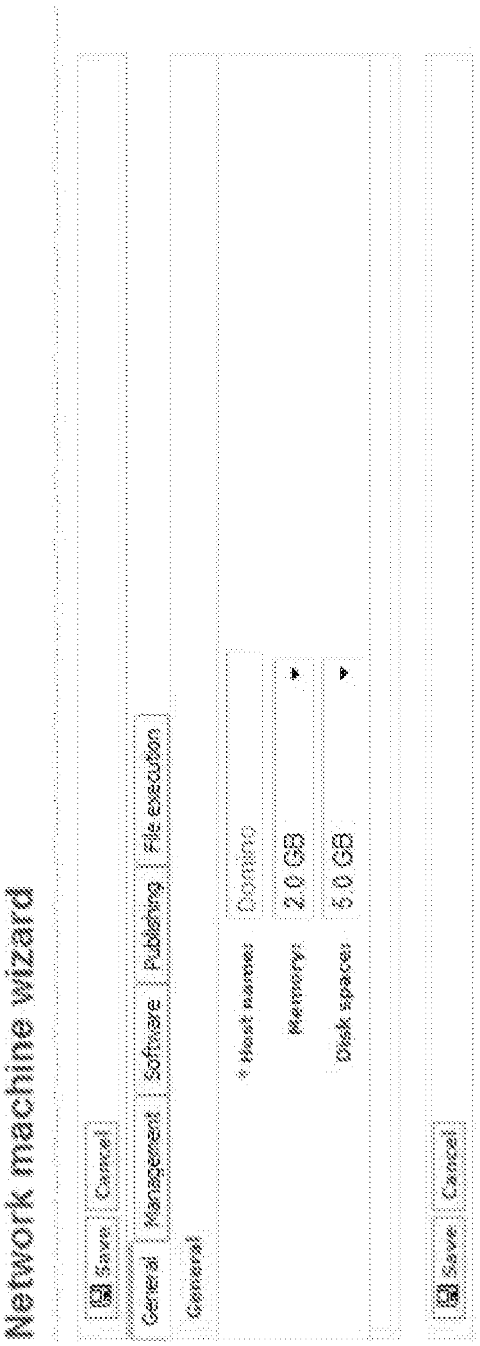

The user has to define the operating system, the amount of memory (RAM) and the amount of hard disk space (FIG. 6*d*).

For one solution one or more virtual servers can be assigned with the same or different configurations.

Figure 6E:
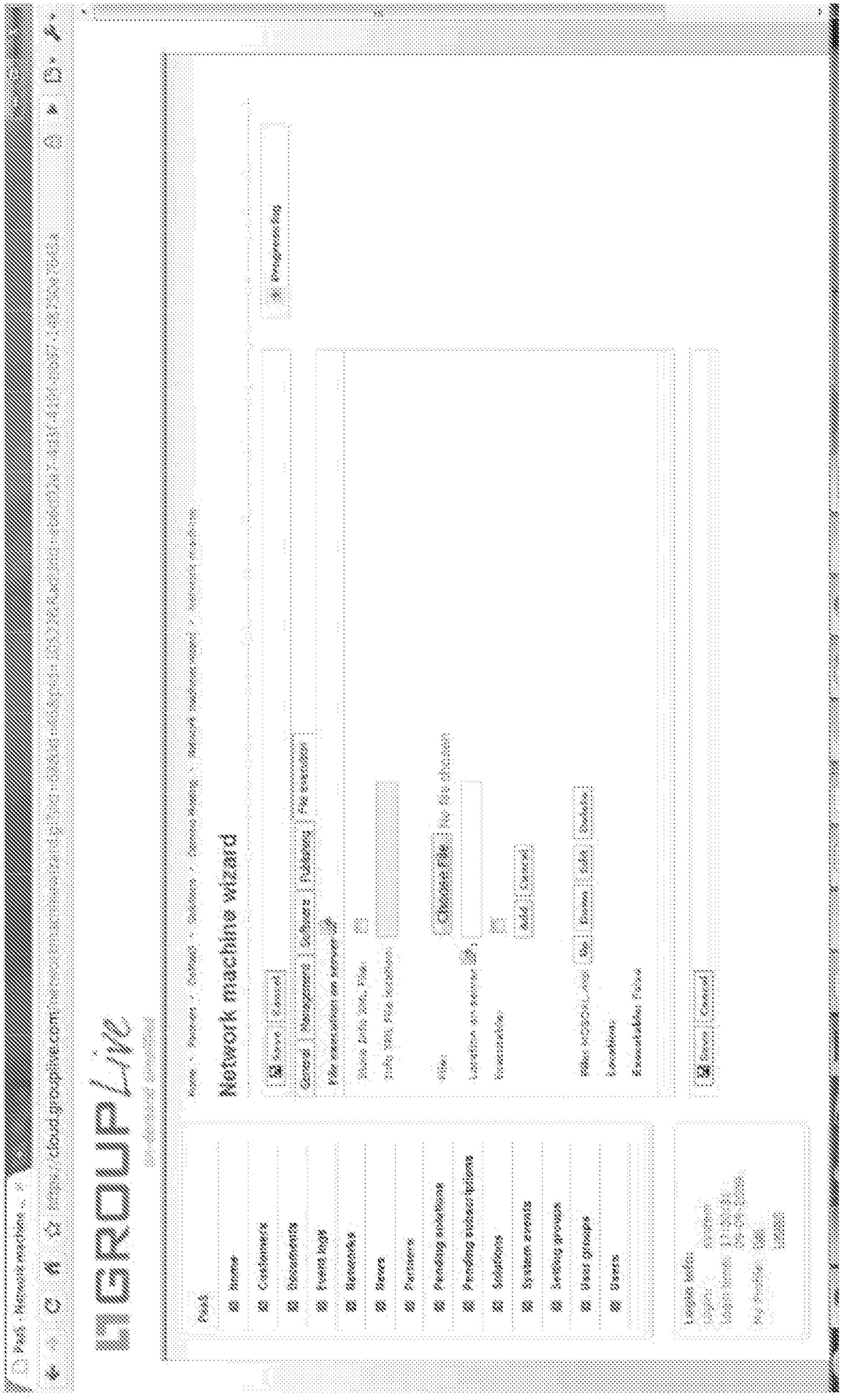

With the slider "file execution" a menu for loading an installation file of a software application for a solution is opened (FIG. 6*e*). Any files, particularly installation files, can be uploaded. These files 11 are stored on the control server 3 and it can be specified where these files are placed on the virtual server during installation (FIG. 2). The name and place of these files is stored in the platform configuration database. Such installation files are for example msi-files (Microsoft Software Installation) or rpm-files for Linux systems. In this menu an XML-file with customer specific information can be specified and it can be defined where it should be placed on the virtual server.

Instead of ordinary installation files it is also possible to provide a template with one or more image-files of a certain software application. It is also possible to install besides ordinary installation files image-files which are immediately executable runtime versions (instances) of a software application if loaded to a predefined virtual machine. These image files are to be stored on the application servers 2, wherein a copy of a predefined template is stored to each suitable application server 2. A suitable application server 2 is a server on which a server operating system is installed on which a virtual server and an operating system can be set up which are suitable for the software application defined by the image files of the respective template. A software application can comprise several image files. These image files for installing a software application are collected in an application template. It is also possible to provide data for a certain software application by means of image files. These image files are collected in data templates. The templates comprise besides the image file a loading file in which the order is defined with which the image files of the respective template have to be loaded. In the embodiment from which screenshots are shown in the FIGS. 4*a*-4*g* only the administrator of the platform can upload image files and create templates. However, the platform operating system can also contain a routine for uploading image files, creating templates and automatically distributing the templates to the suitable application servers 2.

Thus this slider allows the loading of a new software application to the platform.

Figure 6F:
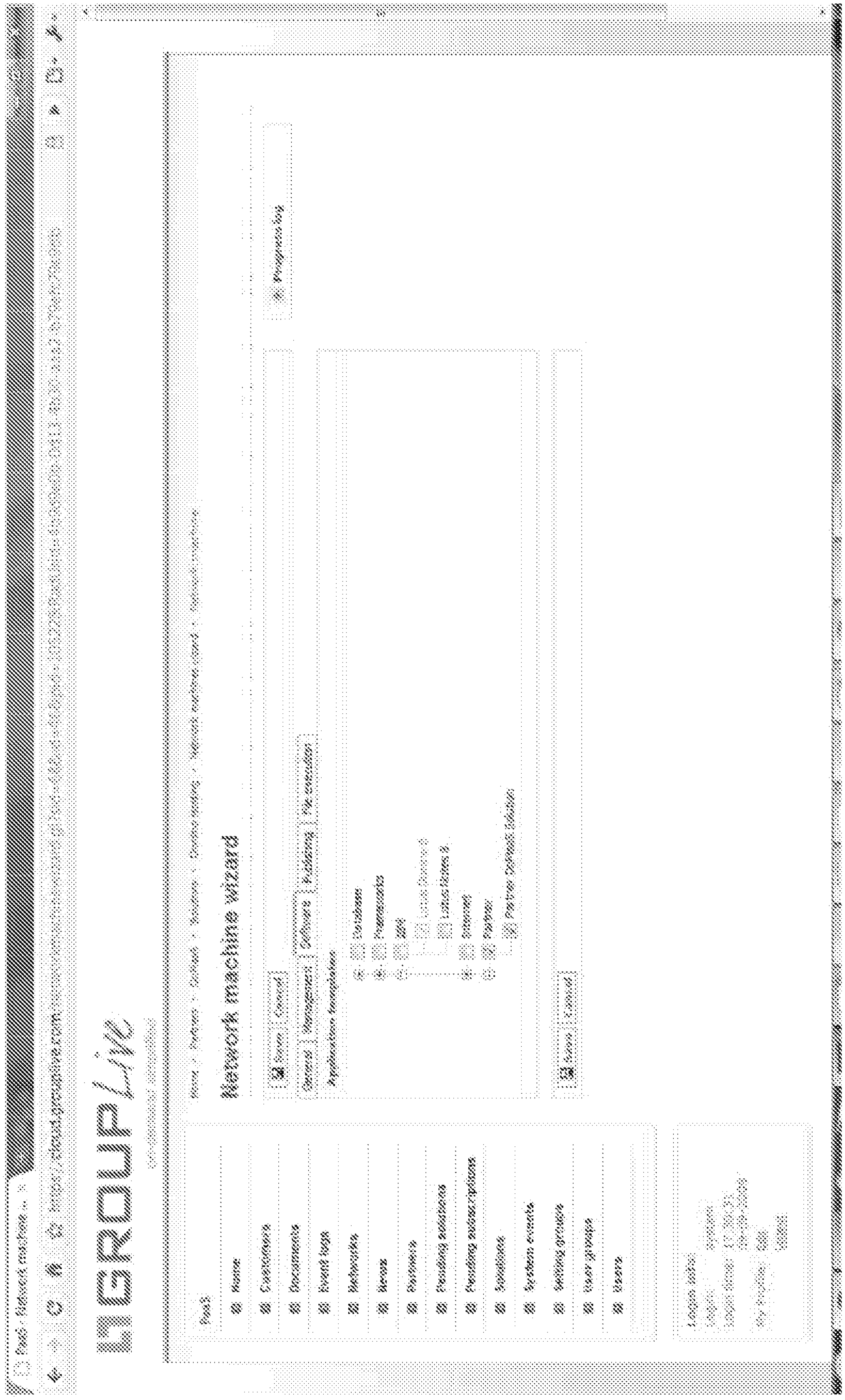

With the slider "software" it is possible to choose already stored application templates. On this slider directories are displayed for different application templates. Each application template comprises one or more image files of a certain software application. It is also possible that several application templates are linked to each other. In the present example the software application of a partner which is called DoMaaS solution is based on Lotus Domino 8 (FIG. 6*f*). Thus selecting the software application DoMaaS solution also selects automatically the software application Lotus Domino 8.

Figure 6G:
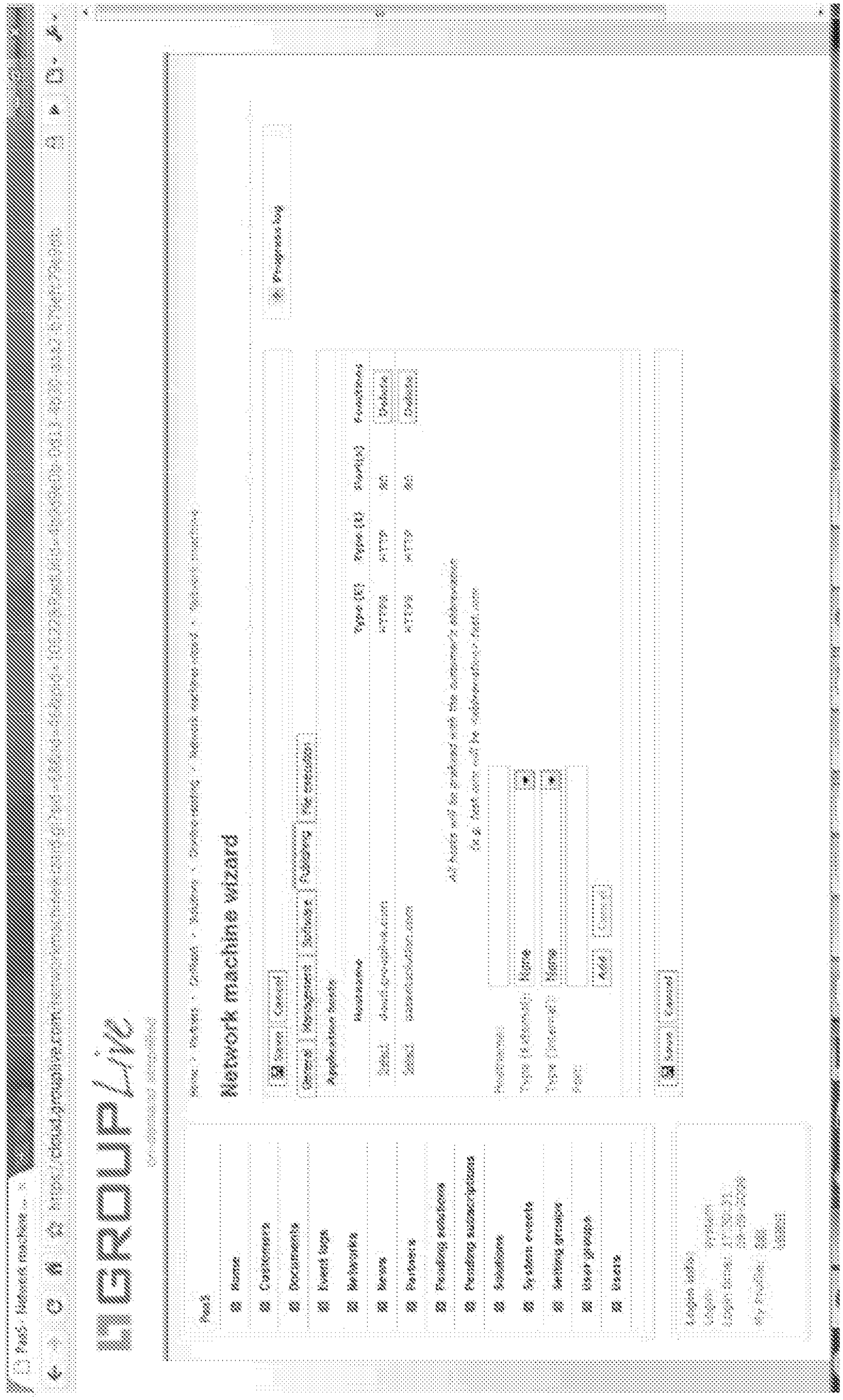

With the slider "publishing" it is defined how the specific solution is published to the internet, namely, that a public URL will point to this virtual server after installation of a solution (FIG. 6*g*). This means that a public DNS entry is registered in the firewall. The platform operating system comprises a routine for automatically creating such DNSs, wherein for example a prefix is automatically created like cust1.cloud.grouplive.com, cust2.cloud.grouplive.com, cust3.cloud.grouplive.com, etc, wherein cust1 is a prefix which stands for Customer No. 1. The communication between the servers 2, 3 and the firewall server 6 is carried out by means of http- or https-protocol.

With the registration of such a solution all necessary data are entered for automatically creating a virtual server and installing an executable runtime version of the software application in this virtual server.

A solution can be registered in such a way that a user and/or a listener can initiate an installation of the solution on the platform. An installation of a solution means that a new instance of the software application of the solution is created in a virtual server. A user will initiate the installation on behalf of a listener.

An installation is started by clicking the button "subscribe". If listener specific data have to be entered they will be automatically requested by a certain dialog. Nothing else is to be done. When the installation process is started the following steps are automatically carried out:

Step S1: Preparing the installation

The selected solution is looked up in the platform configuration database (PCD).

The necessary size of a network is determined on the basis of the registered data for the solution, particularly on the basis of the number of virtual servers. Thus the necessary number of IP-addresses are reserved e.g. for one virtual server four IP-addresses, for two to four virtual servers eight IP-addresses and for five to thirteen virtual servers 16 IP-addresses are reserved.

Step S2: Assigning a private virtual network

A private virtual network is automatically created. In the present embodiment a unique number between 1 and 4,000 is assigned in the platform to the new virtual network. From the platform configuration database the kind of network hardware and the kind of firewall are read out. On the basis of this information the switches of the physical network and the firewall are automatically programmed with the hardware-specific commands to install the private virtual network on the platform. Optionally vpn rules are programmed in the firewall and further firewall setups are optionally automatically programmed.

Step S3: Creating a virtual server

The registered data of the solution are read out which define the virtual server(s). These data comprises information about the suitable operating systems of the application server 2 and certain setup data.

Then the platform configuration database is read out with respect to the data describing the physical servers and the already existing installations in the platform. These data are used to automatically determine on which physical server the needed virtual server(s) can be installed. Usually a plurality of physical servers is suitable to install the needed virtual server(s). For a certain virtual server the suitable physical server (application server 2) is selected on which the least number of virtual servers are running. The present platform operating system comprises the platform configuration database in which the relevant information about the physical servers is maintained and a routine for updating and a determination routine for determining suitable physical servers for installing a virtual server.

For creating a virtual server, an ordinary installation routine for installing a virtual server is started and the corresponding parameters as IP-number, host-name are automatically input to the installation process. This installation process also comprises the installation of a predefined operating system in the virtual server. If required the corresponding parameters are automatically read out from the registered information or are automatically created or fetched from a certain place, e.g. in the internet, on the basis of the registered information. However, it is also possible to create a virtual server by means of a server template comprising one or more image files which are just loaded into the application server.

The creation of the virtual server comprises also connecting the virtual server to the private virtual network. This is done by a routine which assigns one of the IP-addresses reserved for the virtual network to the virtual server.

For creating one or more users on the newly created virtual server the type of the virtual server is read out from the platform configuration database by a specific user routine for creating the users. The "type of virtual server" means also the type of the operating system installed in the respective virtual server. On the basis of the type of virtual server the user routine set up the users in the virtual server. Each type of virtual server—even different Linux-flavours—requires different commands for creating the users. The user routine is designed to creating users on different types of virtual servers by means of the data read out from the platform configuration database.

The virtual network and the virtual server form a computer environment. On one platform several computer environments can be installed, wherein each computer environment is totally independent of the other computer environment. This secures that a user or a listener of one computer environment does not have any access to any other computer environment and does not even see the other computer environment. Only the administrator of the server platform 1 can see the several computer environments. The user who administrates one or more solutions on the server platform has only limited access to the computer environment of each solution. His access is limited by a right management system which is located on the fire control server 3 and which defines the rights for reading, writing and deleting in the computer environment. The firewall server connects the user to the control server and to the virtual LAN of the respective computer environment and a listener only to the virtual LAN of the respective computer environment. The access of the user and the listener is therefore limited by the boarders of the virtual LAN.

The listeners have in comparison to the user a limited access which allows the listeners just to use the solution. The rights of the listeners for reading, writing and deleting data are defined by the right management of the virtual machine of the corresponding computer environment. and/or the right management system of the control server 3.

Step S4: Installing the selected solution

The installation of the selected solution is automatically started. This can be done by automatically starting an ordinary installation routine which can be provided in the form of msi-file or an rpm-file on the control server 3. The msi-file or RPM file is specified under a file executing tab, meaning that the file will be copied from the control server 3 to the new virtual server during installation. This file is executed with uploading the executable installation file to the virtual server, which initiates the installation. The necessary parameters are automatically read out from the platform configuration database and entered into the installation process.

The solution can alternatively be installed just by loading an application template comprising one or more image files of the solution from the corresponding application server 2 into the virtual server installed on this application server. This is the preferred way of installation, as it is very quick. As for each solution a separate virtual server is created the environment, namely the virtual server and the operating system running on this virtual server and the corresponding settings for the instance are exactly defined. Thus it is easy to install the solution just by loading an application template as the environment is nearly always the same. If the application template comprises a number of images then the images have to be loaded in a certain order. This is automatically controlled by the system by means of the loading file which is contained in the application template.

Step S5: Running custom post-process code

One or more batch-files can be run automatically to adapt the installation to a final configuration. These batch-files can be automatically executed after the registration of the solution. It is also possible that the user creates manually such a batch-file for each solution to define certain settings. A typical action of such batch-files is e.g. to adapt the instance in such a way that the instance is automatically started when the corresponding virtual server starts. With such batch-files it is also possible to configure specific values in a database.

Step S6: Set up events

The platform operating system provides a function that on certain events a predefined service is carried out. These events and the corresponding code are defined in an event file which is created automatically or manually when the solution is registered at the system. The event system comprises a routine in the platform operating system which monitors certain events. Such an event can be any action which is carried out automatically or manually. Each event points by means of a pointer to a certain service routine. The pointer is preferably a URL which points to the service routine. The service routine will receive on an event preferably an XML-file containing data of the platform configuration database, wherein that data is used to carry out the predetermined service routine. These events can be regarded as a kind of software-interrupts.

For example, some solutions comprise user databases in which the data of the listeners are stored. As the listeners have to be defined it is possible to synchronize the definitions of users of the virtual server (=listeners) and of the instance in such a way that if a new listener is created on the platform then this is detected as an event which triggers the start of a routine which reads out the corresponding parameters of the user definitions with respect to this solution from the platform and enters corresponding user definitions in the instance of the solution. This can be done by means of a database which is installed on that virtual server. This database should be filled with predefined parameters like the customer's name and address. Then the event system can be used to receive the customer specific information from the platform configuration database or a user specific XML file which is stored on the control server and which is registered in the platform configuration database. The necessary records are created in the database just after installation by using an executable file which is also uploaded to the virtual server.

Step S7: Assigning an automatic scripts on settings

Predefined scripts are assigned to certain changes of settings. For example if a new password is entered in the solution a corresponding script is automatically started for registering the new password in the relevant parts of the platform operating system. A further example is if one of the solution settings of the instance is the listener's website and that is stored in a databases on the virtual server. This is e.g. useful to automatically enter the URL of the listener's website into a signature when listeners are sending emails out from the system. If the listener's website URL changes then an event is called to change the URL in the database.

Step S8: Publishing the solution for the listener

To make the solution available to the respective listeners it has to be published in the firewall. The listeners of the instance need not coincide with the user who was starting the installation of the solution on the platform. Usually there is a large amount of listeners who are using a certain solution, wherein the installation of such a solution is initiated usually only by a single user. This single user can of course be one of the listeners. The creation of the publishing rules begins with determining the type of firewall and reading out the relevant information to the registered listeners of this solution. Then the firewall is automatically programmed. This programming comprises for example the definition of the host-names of the listeners and the corresponding requests which are mapped to the internal private virtual network and the virtual machine (s). The corresponding information is received from the registered configuration of the solution.

The steps S1 to S8 are carried completely automatically. Usually this takes about three minutes to ten minutes. This depends on the size of the solution and the provided computing power on the platform.

The event system and the means for publishing the solution for a listener form a generic mechanism to exchange information and integrate applications which are based on events and XML web-services. This means that any application can be integrated using standard interfaces.

Figure 3:
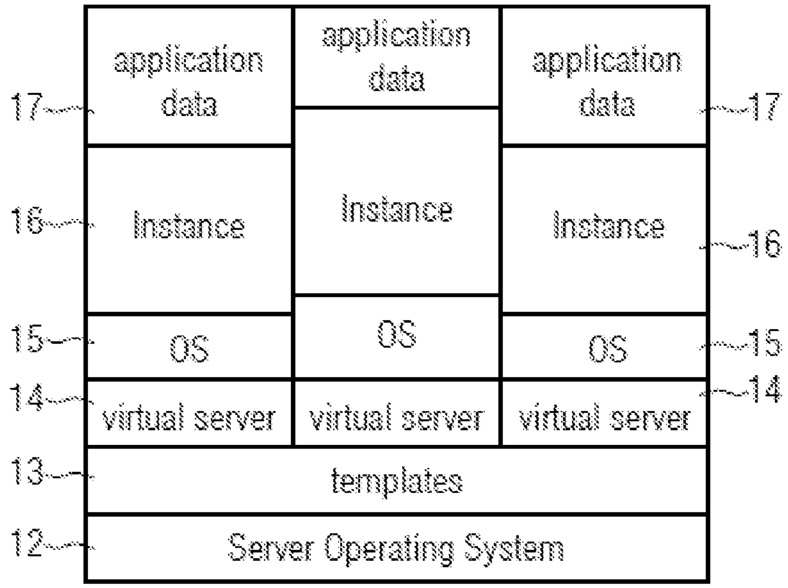
FIG. 3 shows the software structure of a physical server.

FIG. 3 shows the software structure on an application server 2 after the installation of several instances on this application server. The server operating system 12 forms the basic layer. On this basic layer the templates 13 are provide. On the server operating system 12 several server installations 14 are provided, wherein each server installation forms an individual virtual server.

In each server installation 14 an operating system 15 is running

The instance 16 is installed on the operating system 15. The instance 16 has access to a memory space containing application data 17.

On one application server 2 several server installations 14 can be provided so that several virtual servers can simultaneously run on one physical server. These virtual servers run each their own operating system, so the instances and the application data are clearly separated from an instance and the application data of another virtual server.

The above platform operating systems is designed for automatically installing single tenant software application to a platform. Of course it can also be used for multi tenant software applications.

Figure 4:
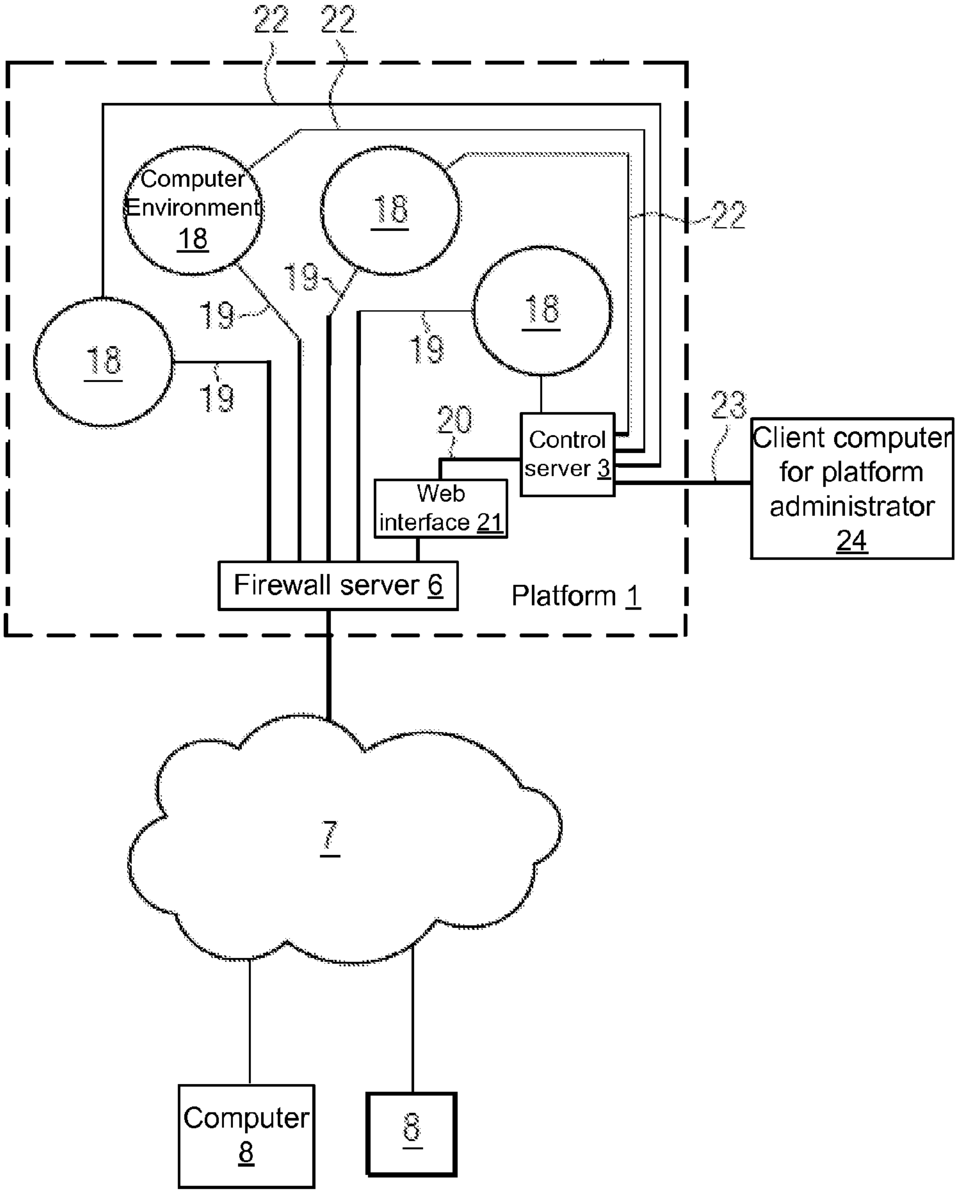
FIG. 4 is a block diagram showing schematically the logical components of a platform which is connected to the internet.

FIG. 4 shows schematically the logical components of the platform 1 to which several client computers 8 are connected via the wide area network 7. The platform 1 comprises the firewall server 6 and the control server 3. On the platform 1 several computer environments 18 are installed. Each computer environment 18 comprises a virtual network connected to at least one virtual server. Each computer environment 18 is connected to the firewall server 6 by means of one or more logical data lines 19. These data lines 19 provide the access for listeners to the computer environments 18. Therefore, these logical data lines 19 are called listener data lines 19.

A further logical data line is established between the firewall server 6 and the control server 3. This logical data line 20 provides access for user to the control server 3 for installing or deleting a computer environment 18 which is administrated by the corresponding user. This logical data line 20 is called user data line 20. In the present embodiment the user can access onto the control server 3 only via a communication unit 21 which is in the present embodiment a web interface 21, which is provided in between the firewall server 6 and the control server 3 and through which the user data line passes. The web interface provides a limited set of functions which access the control server 3. The user can only use these functions. This is limited both by the rules of the interface, namely the firewall server 6, and by the right management of the control server 3. The user has on the control server 3 only limited rights which enable him to activate these functions for installing and administrating the correspondent computer environments 18 and the solutions in the computer environments 18.

The communication unit 21 can also be integrated into the firewall server 6 or into the control server 3 or being placed outside of the firewall server 6. Instead of a web interface any other communication units can be provided which establishes a data connection from the control server 3 via the firewall server 6 to a client 8 which is used by the user.

From the control server 3 separate logical data lines 22 are provided to each computer environment 18. These data lines are called control data lines 22.

A further logical and physical data line 23 is provided to the outside of the server platform 1 which is connected with a further client computer 24 which is used by the administrator of the server platform 1. The administrator of the server platform 1 has complete access to the hard- and software of the server platform 1, wherein the access to the solutions of the computer environments 18 can be limited. The administrator of the server platform 1 has at least the right to boot and shut down each physical server and to install and deinstall hard- and software components to the platform 1. The data line 23 can be part of a wide area network, e.g. the internet, so that the administrator must not necessarily be located at the site of the platform 1.

The administrator of the platform can of course also use the functions for automatically installing and administrating virtual servers and solutions on the server. This facilitates the administration of the server platform 1 significantly. The right management at least for the platform administrator is located on the control server 3.

Figure 5A:
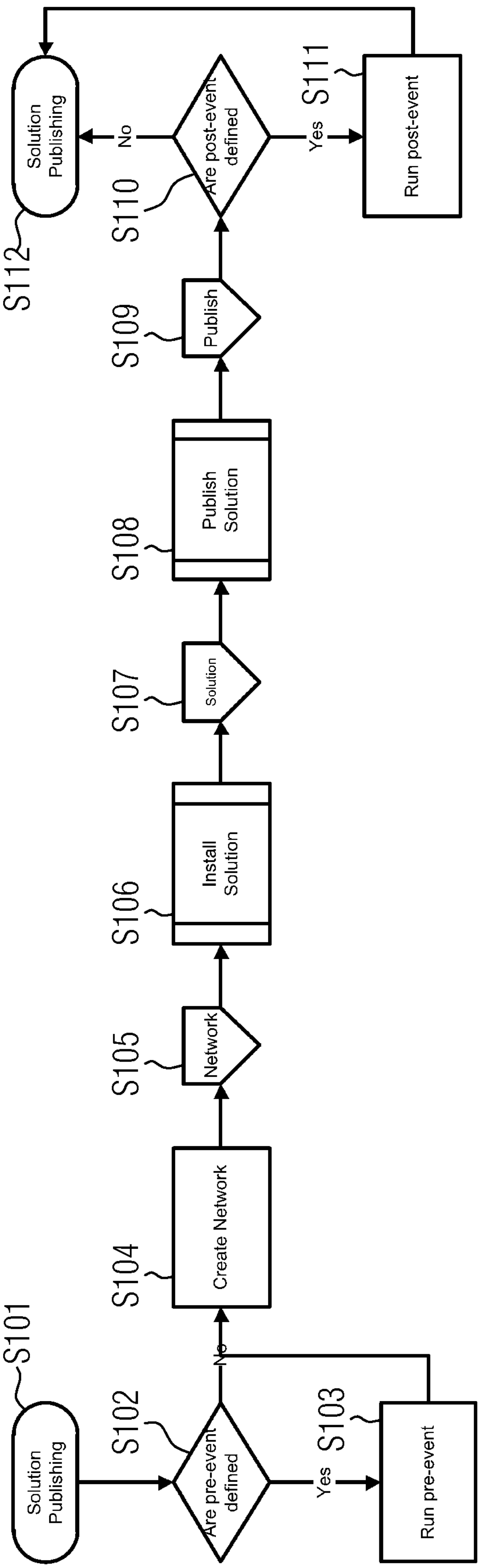
FIG. 5*a*-5*d* are flow diagrams of the basic steps of the installation of o solution.

In the following the basic steps of installing a solution are described by means of the flow diagrams shown in FIGS. 5*a* to 5*d*. FIG. 5*a* shows a main routine, wherein in FIG. 5*b*-5*d* subroutines are depicted which are called in the main routine of FIG. 5*a*.

The main routine according to FIG. 5*a* starts with the step S101. In the step S102 it is decided whether there are any pre-events defined. If this is the case then the pre-events are carried out in step S103. After carrying out the pre-events or if in step S102 it is decided that there is no pre-event the creation of the network starts with step S104. The corresponding data of the network are read out from the configuration database in step 104. A subroutine is called (S105) in which an isolated virtual network is created.

With step S106 the creation of solution starts, wherein the corresponding data are read out from the configuration data base 9. A subroutine (S107) is called with which the virtual server, the virtual server(s) and the solution are installed.

With step S108, in which the relevant data for connecting the solution to the interface (firewall server 6) are read out from the configuration data base 9, the publication is started. By means of a further subroutine (S109) the publishing of the server/solution is carried out.

Afterwards it is checked whether any post-event is defined (S110). If these post-events are defined, then they are carried out with the step S111. The work flow then goes to step S112 with which the main routine is terminated. If the check in step S110 reveals that there is no post-event, then the work flow goes directly from step S110 to S112 and terminates the main routine.

Figure 5B:
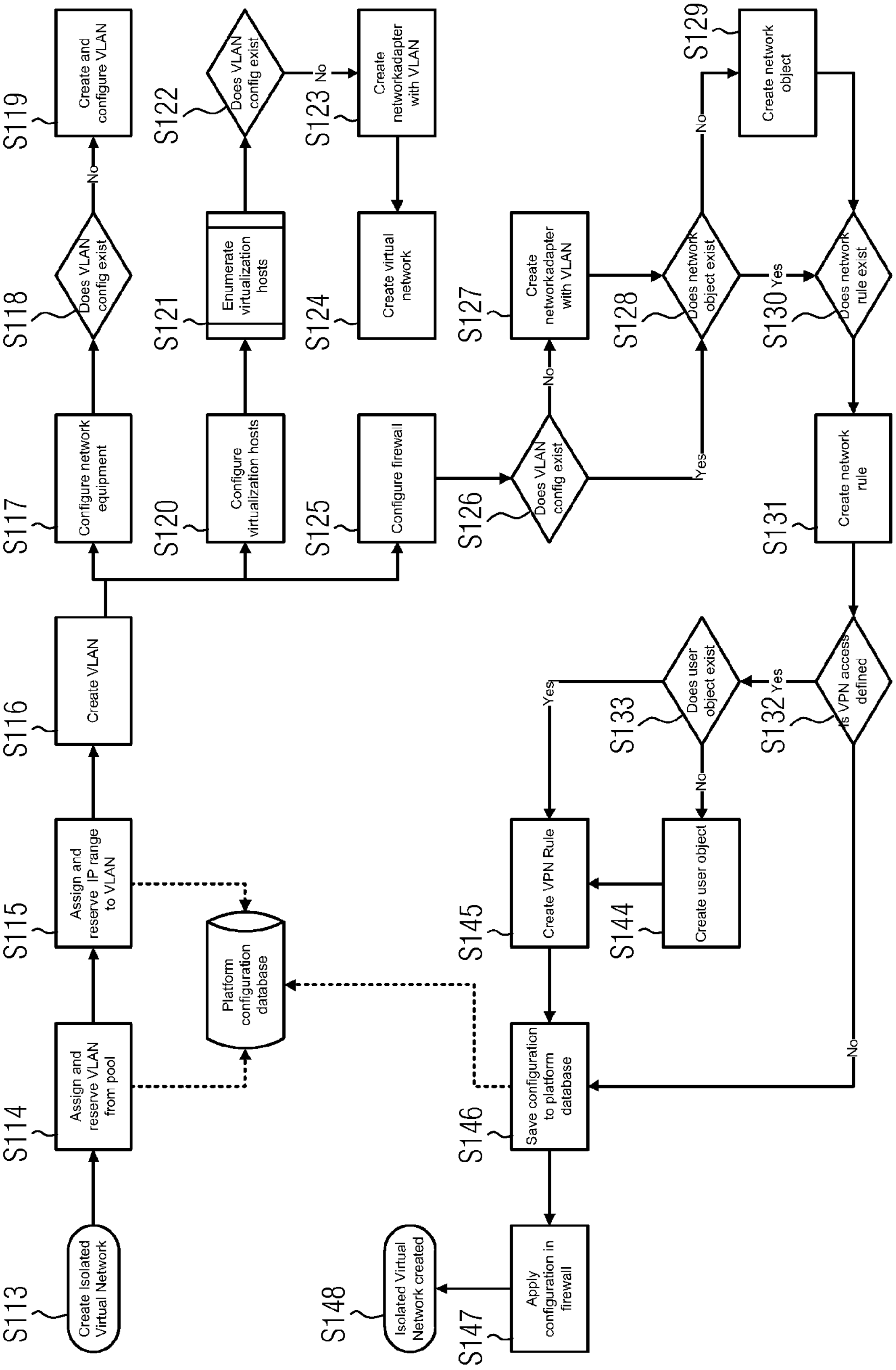

FIG. 5*b* shows the subroutine for creating an isolated virtual network. This subroutine is called in step S105. This subroutine starts with the step S113. In the following step S114 the number of virtual networks (VLAN) is determined and reserved. There is an IEEE standard for Virtual Bridged Local Area Networks (IEEE Std 802.1Q1998) according to which the maximum number of virtual local area networks is 4000. The virtual networks are listed in a pool. Therefore, an available number of this pool has to be assigned to the virtual local area network. This number is registered in the platform configuration data base.

Then an IP-range is determined and reserved for the virtual network (S115). The size of the range of the IP-addresses depends on the number of virtual servers which are to be installed in the virtual network. This can be calculated on basis of the information received from the platform configuration data base. Then the corresponding range of IP-addresses is selected from an available range. This range is reserved for the virtual network and stored to the platform configuration data base.

With step S116 the creation of the virtual network is started. This step S116 starts three routines which are running substantially in parallel. The first routine is to configure the network equipment (S117). In this routine it is firstly tested whether the virtual network does exist already (step S118). If the network already exists then this routine is stopped. This can be the case if the main routine according to FIG. 5*a* is started again for installing a further virtual server in an existing virtual network or for updating the solution. If the decision in step S118 does not exist then virtual network is created and configured in the physical network equipment of the server platform 1 (S119).

The second routine (S120) relates to the configuration of the virtualization hosts, namely the application servers 2. In step S121 the virtualization hosts are enumerated and the following steps are then carried out for each host 2 separately. In step S122 it is tested whether the virtual LAN is already configured on the corresponding host. Only if this is not the case, then on this host a corresponding network adapter is created (S123). Thereafter the virtual network is configured on that host 2 (S124).

The third routine relates to the configuration of the firewall for the virtual network (S125). In this routine it is firstly checked whether the configuration of this virtual network does already exist in the firewall (S126). If this is not the case then a network adapter on the firewall server to the virtual network is created (S127).

Then it is checked, whether the virtual network does already exist as an object in the firewall (S128). It is necessary to configure the virtual network as an object in the firewall to address this object by rules for communicating via the firewall. If in the step S126 it is decided that the wireless network does already exist on the firewall server, then the workflow is going directly to the step S128.

If no network object exists in the firewall, then such a network object is created in step S129. Thereafter, it is checked whether the corresponding network rules exist in the firewall (S130). With these network rules it is defined who is allowed to communicate with whom through the firewall and which kind of communications ports may be used and which kind of information may be exchanged. For example, the exchange of certain types of files, particularly compressed zip-files, can be forbidden. With these rules it can also be defined whether the content of the communication is controlled, e.g. for containing spam, virus, etc.

If in step S128 it is decided that the network object does already exist, then the workflow goes directly to step S130.

If in step S130 it is decided that the network rules do already exist, then the routine for configuring the firewall is finished. Else the network rules are created in a routine starting with step S131. In step S132 it is checked whether a virtual private network access (VPN access) is defined. If this is the case then it is checked whether one or more corresponding user objects exist in the firewall (S133). These user objects are objects which are related to one or more users and one or more listeners. If this is not the case, then the corresponding user objects are defined in step S144. Thereafter, the virtual private network rules are created in step S145. If it is decided in step S133 that the user object does already exist, then the workflow goes directly to step S145.

With step S146 the virtual private network rules and the user objects are stored in the platform configuration data base as part of the virtual private network configuration.

If in step S132 it is decided that the virtual private network access is already defined, then the workflow goes directly to step S146.

In the following step S147 the virtual private network configuration is applied to the firewall. With the following step S148 the routine for creating the isolated virtual network is finished and the workflow is returned to the main routine according to FIG. 5*a*.

Figure 5C:
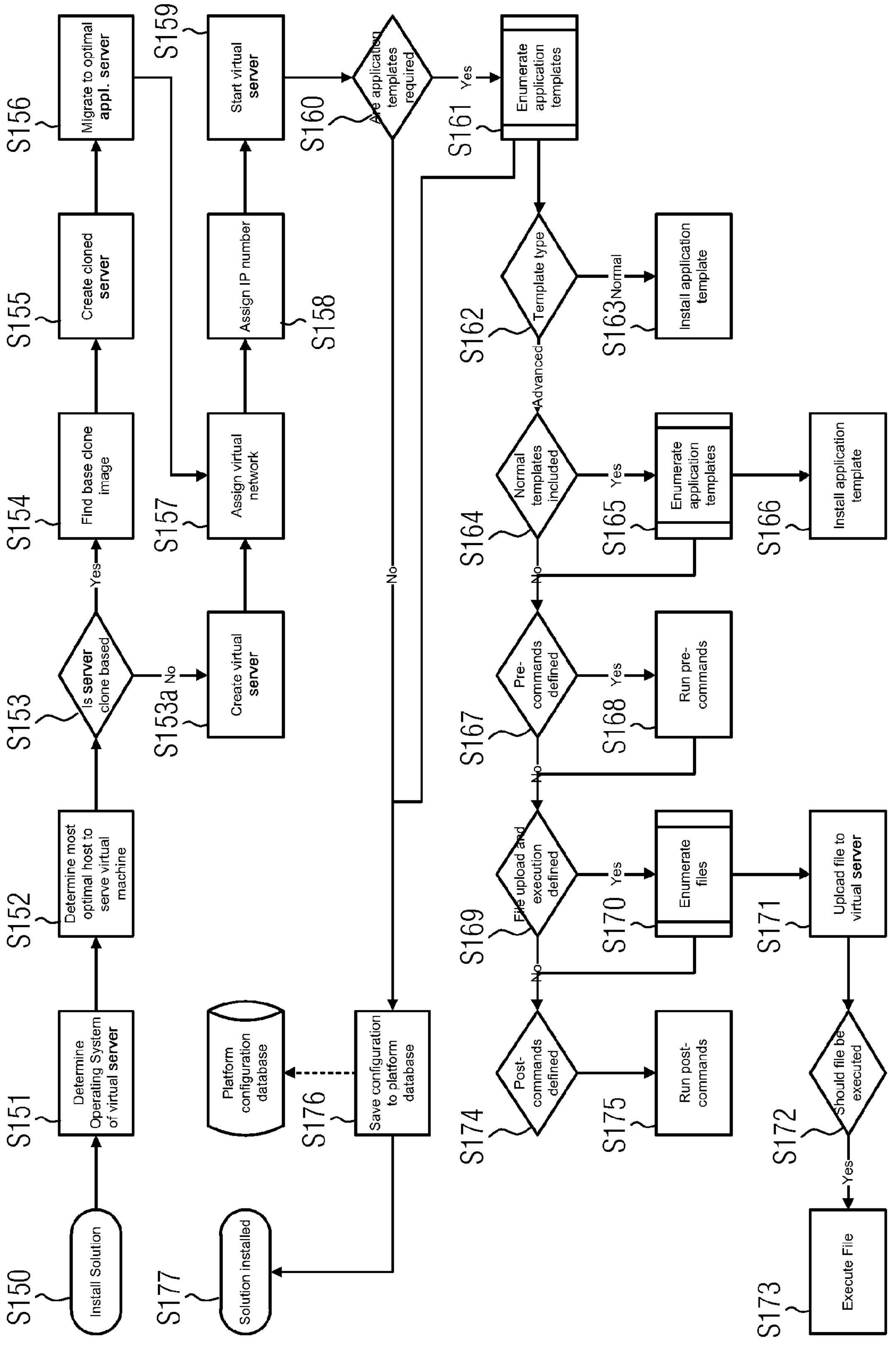

FIG. 5*c* shows a routine for installing a solution which is called in step S107 in the main routine of FIG. 5*a*. This routine starts with the step S150. Firstly, it is determined which operating system is needed for the virtual server(s) (S151). In step S152 the most optimal host (application server 2) for the virtual server(s) is determined.

Then it is decided whether the server is based on a clone (S153). If this is the case, then a corresponding image of the clone is selected (S154). The cloned server is then created by loading this image to one of the application servers 2 (S155). Afterwards, such created virtual server is then migrated to the optimal application server 2 (S156). Then the workflow is going onto the step S157 in which the virtual network is assigned to the virtual server.

If it is determined in step S153 that the server is not clone-based, then the workflow goes to the step S153*a* in which the virtual server is created by means of an ordinary installation routine which is automatically conducted. Then the workflow goes to step S157 in which the virtual network is assigned. Then the corresponding IP-number is assigned to the virtual server (S158). The virtual server is started in step S159.

In step S160 it is checked whether one or more application templates are required. If this is the case, then the workflow goes to the step S161 in which the application templates are enumerated and the routine which is following on step S161 is carried out repeatedly for each template.

In step S162 it is checked whether the template is of an advanced template type or of a normal template type. If the template is a normal template type then the application is installed by loading this template in step S163. In this case the routine for this template is finished. If it is determined in step S162 that the template is of an advanced template type then it is checked in step S164 whether the advanced template type comprises one or more normal templates. If this is the case, then the normal templates are enumerated in step S165 and each template is installed in step S166. After installation of the last template the workflow goes to the step S167. If in step S164 it is determined that the advanced template does not comprise any normal template the workflow goes directly to step S167. In step S167 it is checked whether any pre-commands are defined which are then carried out in step S168. If it is determined that no pre-commands are defined in step S167 then the workflow goes to step S169. In step S169 it is checked whether one or more files shall be uploaded and executed. If this is the case, then these files are enumerated in step S170. For each file the following steps S171-S173 are carried out separately. In step S171 the corresponding file is loaded into the virtual server. In step S172 it is checked whether the file should be executed. If this is the case then the file is executed in step S173. After installing all files the workflow goes to the step S174 in which it is checked whether any post-commands are defined. If in step S169 it is determined that no files shall be uploaded then the workflow goes directly to the step S174. If in step S174 it is determined that post-commands are defined then these post-commands are run in step S175.

After having installed all templates and/or files the workflow goes to the step S176 in which the configuration is saved to the platform configuration database. If in step S160 it is determined that no application template is required then the workflow is going directly to the step S176. With the step S177 the routine for installing the solution is finished and the workflow is returned to the main routine of FIG. 5*a*.

The routine shown in FIG. 5*c* is just an example. It is also possible to install the solutions not only by means of templates. A solution also can be installed by means of an ordinary installation routine.

Figure 5D:
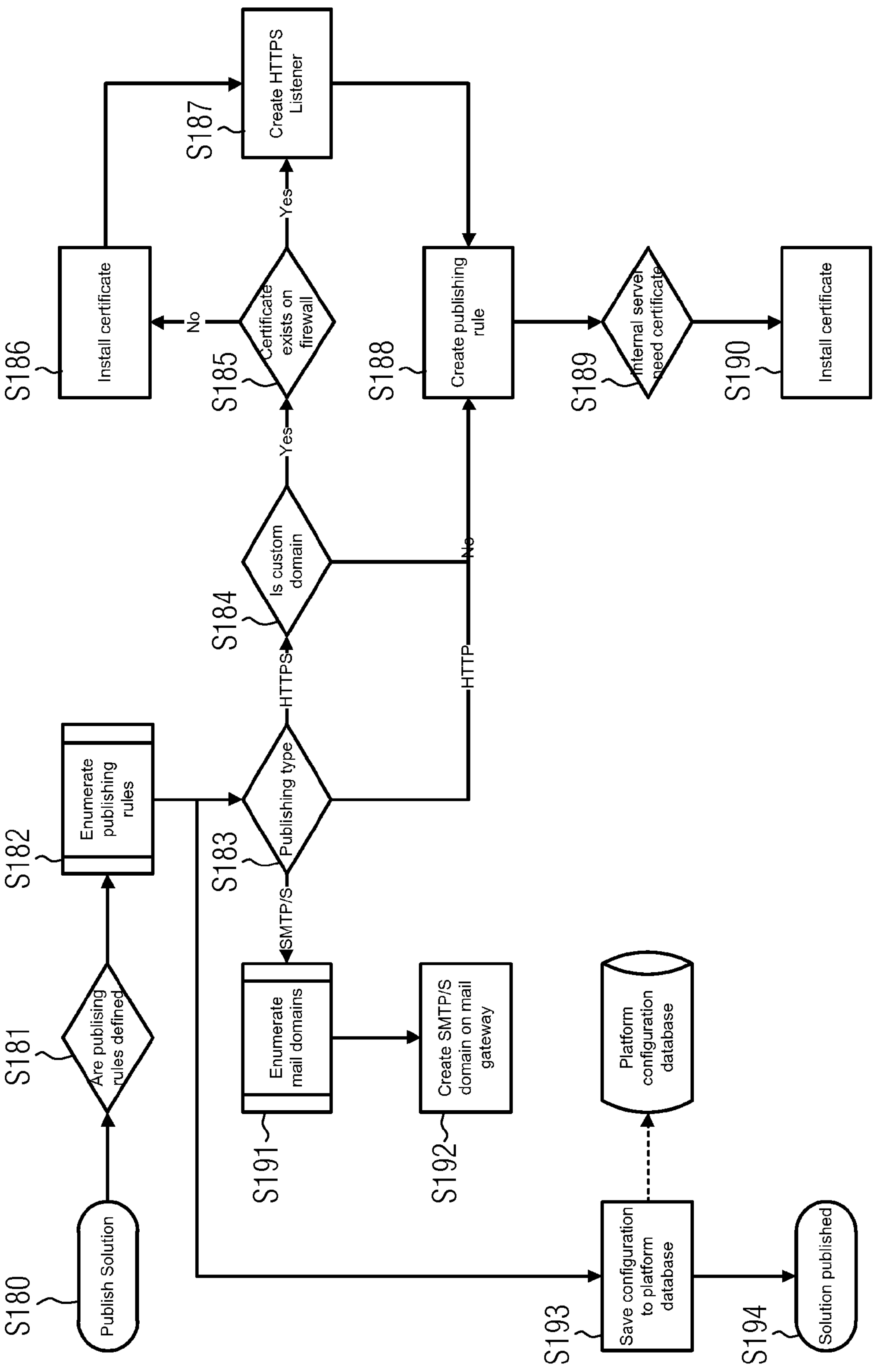

FIG. 5*d* shows the subroutine which is called in step S109 in the main routine of FIG. 5*a* for publishing the solution. This subroutine starts with step S180. In step S181 it is checked whether the corresponding publishing rules are already defined. This can be the case e.g. if the main routine is repeatedly carried out for updating a certain solution. If the publishing rules are already defined then this subroutine is finished and the workflow returns to the main routine. Else the publishing rules are enumerated in step S182. For each publishing rule the routine which is following to step S182 is carried out separately.

In step S183 the type of the publishing rule is checked. The publishing rule can be based on one of the following protocols: SMTP, SMTPS, HTTP, HTTPS or any other protocol which is suitable for a communication via a firewall or another interface in a local area network and/or in a wide area network. The present embodiment can handle a communication via SMTP, SMTPS, HTTP and HTTPS. If the communication is based on HTTPS (Hyper Text Transfer Protocol Secure) then it is checked whether the communication shall be carried out with a custom domain (S184). A custom domain is the domain under which the solution shall be published and which can be defined in advance by the user. If this is the case then it is checked, whether a corresponding certificate already exists on the firewall (S185). If this is not the case, then a corresponding certificate is loaded and installed (S186). Thereafter a listener is created in the firewall based on the HTTPS-Protocol (S187). If the certificate already exists on the firewall then the workflow goes directly from step S185 to step S187.

Then it is checked whether the internal virtual server needs a certificate for communication via this port (S189). If this is the case then such a certificate is loaded and installed in the firewall (S190).

If in step S183 it is determined that the publishing type is the protocol HTTP then the workflow goes directly to step S188.

If in step S183 it is determined that the publishing type is SMTP or SMTPS (Simple Mail Transfer Protocol or Simple Mail Transfer Protocol Secure) then the communication is done via e-mails. In step S191 the corresponding e-mail domains are enumerated, wherein for each e-mail domain an SMTP/S domain is created on a mail gateway (S192). Such a mail gateway can be provided in addition or alternatively to the firewall server 6.

After creating and installing all publishing rules which means that all communication ports are installed, the workflow proceeds to step S193 in which the publishing rules are stored to the platform configuration data base. The subroutine is finished with step S194. The workflow is returned to the main routine according to FIG. 5*a*.

In the following the system is described by means of examples. The first example is a solution which uses Lotus Domino 8 as a software application.

This solution is called "Domaas". By this solution listeners can get a Domino webmail environment in just a few mouse clicks. This solution provides for each listener a virtual server where Lotus Domino 8 is installed. The listener or a customer of the platform who provides this service to listeners only needs to sign up through the platform and all the administration of the respective listener is done by the platform. This means that the listener will never log-on to the virtual server other than when accessing his mailbox from a web browser. Each listener will get his own URL which is pointing to the corresponding virtual server. The listeners are usually business enterprises which subscribe a certain software application by a user of the platform. Each listener comprises usually several end-users who are using the instance running on the platform. All end-users can access their mail by logging in with a user name and a password. When this solution is installed the above described steps S1 to S8 are carried out automatically. Herewith the following is achieved:

1. A virtual server with the operating system Windows 2003 is created.

2. An instance of Lotus Domino 8 is installed by means of loading an application template.

3. A domino database with all the web services with which the platform has to communicate is installed by means of data template.

4. A URL is created which is specific to the listener who subscribed this solution.

As the software application Lotus Domino 8 comprises a user database for the end-users the administration actions for synchronizing the registered end-users in the platform operating system and the virtual server on one side and the user database of Lotus Domino 8 on the other side are configured in the event system. The following events are configured:

On remove the solution from the platform (Soft): Remove all end-users' access to the mail file.

On remove the solution from the platform (Hard): Delete all end-users and mailboxes in the system.

Remove account: Delete all end-users' and mailboxes in the system.

Account disable: Remove all end-users' access to the mail files.

Account enable: Give all end-users' access to their mail file.

Add end-user (Relate end-user to solution):

1. Send information from the platform to the instance on the virtual server specific to that listener that this end-user needs to have a mailbox on the system.

2. The services then do the following:

a. Create the user in the virtual server's user directory (NAB)

b. Create a new mailbox c. Assign rights to the new end-user to access the new mailbox Update end-user: Update the end-user data in the instance's directory e.g. new email address, new password etc.

Remove end-user from solution: Remove the end-user and the end-users' mailbox in the system.

Disable end-user: Remove all user access to the mail file.

Enable end-user: Give end-user access to the mail file.

Domaas will take around 2 minutes to install. At that point the listener is ready to add end-users to the solution.

Figure 7:
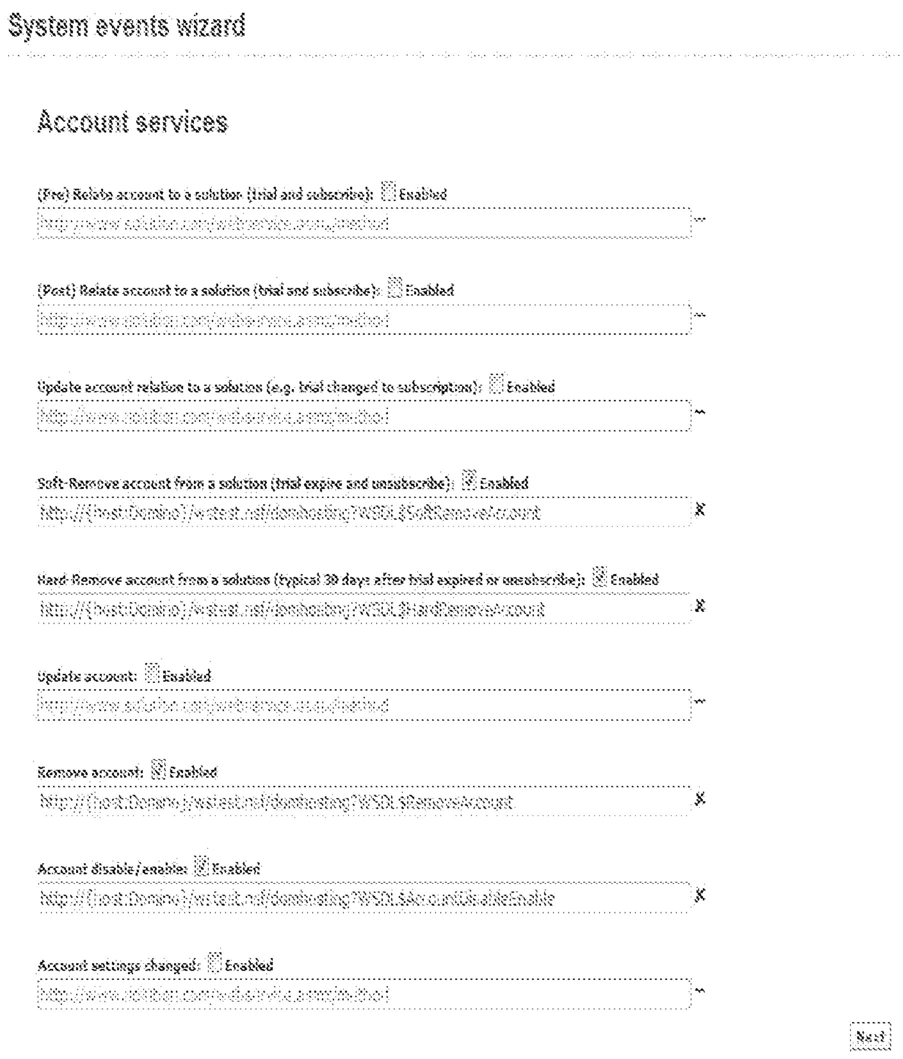
FIG. 7 is a screenshot with listing of events.

A listing of the events is shown in FIG. 7 which is a screenshot. The user of the platform can enable each event separately. In this listing the URLs are given for each event.

The first part of the URL inside the "{ . . . }" tags is a dynamic pointer in use the dynamic pointer is replaced by a certain value which is in the present case an identification of the user of the platform. This means that the web service is installed on all the virtual servers and the platform takes care of the individual services that are called.

The functionality which Domaas provides is normally hosted on premise. If the "time to use" on the on premise solution is compared with having the solution via Domaas, the time difference from the decision is taken until the solution is running is enormous.

On Domaas it is just a few mouse clicks and the solution runs. In an on premise solution the physical hardware needs to be bought and delivered. The new hardware should have a basic operating system installed and Domino on top of it.

The end-users should be created and maintained in the Domino directory, typically by a high skilled IT person. The person also needs to maintain the hardware, like making sure that everything runs as it supposed to.

Also a person with knowledge of mx records should make sure that a public domain name is pointing to the right IP address, so that emails can reach the server and another URL should be configured for the end-users, to make sure that emails can be accessed from anywhere over the internet. A network person should configure the company's firewall to ensure that all mail communication coming in to the firewall is routed to the new server.

The above steps, including waiting for the hardware, can take up to a month from the decision is taken to an on premise installation is in place.

As it is possible with the implementations to fully automize the installation of the software application Lotus Domino 8 in a virtual server this single tenant software can be provided as software as a service (SaaS) with all the advantages of a software as a service system. This is achieved by providing a platform operating system comprising a platform configuration data base containing all platform specific data which are needed for installing a virtual server. Thus the platform operating system can automatically read out the relevant data of the platform configuration database and initiate the installation of the virtual server. Furthermore the solution Domaas comprises on the platform registered data and files for installing automatically the respective instance into the virtual server.

The registration of the solution is simple and can be carried out by any user having average IT-skills like a person who is administrating an on premise solution. This solution can then be repeatedly installed for different listeners without any additional effort.

A second example is a solution for the software application WebCrypt. WebCrypt is used to encrypt emails before they are sent to the recipients. WebCrypt is typically used in connection with an email software product called iQ-Suite®. iQ-Suite® can among other things distribute emails which meets certain rules to a WebCrypt server. The WebCrypt server will then automatically encrypt these emails and send the encrypted emails to the specified recipients.

The platform solution according to this embodiment requires that the listeners have iQ-Suite® in house. In WebCrypt usually some administrators are defined who can change the configuration parameters in the system, which are stored in configuration files and in a database. Besides the administrators end-users are automatically created in the system when the first email is sent to them via WebCrypt.

WebCrypt is Linux based and is using a MySQL database to store configuration values and other settings. When the solution WebCrypt is installed as an instance on the platform it is necessary that the user or the listener answers parameter questions during the installation. There are a few things which should be provided to enable the platform for carrying out the installation:

1. A silent installer shall be provided in the platform. A silent installer needs only parameters which are imported and these should be provided to the silent installer as parameters when the silent installer is initiated. Thus, the silent installer is an installer routine which does not need any user action. The silent installer is started by an ssh script after the installation of the virtual server.

2. Some ssh scripts shall be provided which can comprise configuration values based on parameters (=solution settings).

3. Configuration files shall be generated, which the listener can import to his own on premise iQ-Suite® system to minimize the manual work to configure the solution.

To provide all these elements the above described steps S1 to S8 carry out the following actions:

1. Creating a virtual server with Fedora 10 as operating system.

2. Installing in the virtual server MYSQL and SSL for Apache by means of application templates 3. Creating a directory to copy setup files to the directory by means of a data template.

4. Copy the installation files to the virtual server, wherein the installation files are provided from the control server 3.

5. Unpacking the installation files.

6. Running the installation.

7. Creating a URL which is specific to the listener who just signed up.

8. Creating an email and configuration file and sending the email together with the configuration files to the listener who signed up. The configuration files are already prepared to point to the new virtual server for the listener. The email contains also information about how to import the files into the on premise iQ-Suite® system. As the review solution settings which need to be provided from the listener, the email also describes how to set them up in the platform.

The solution WebCrypt uses the event system for creating and sending the email and the configuration files. A corresponding service is registered by means of an URL in the event "(post) relate account to a solution (trial and subscribe)" which is shown in figure . . . . This calls a webservice, which then generates the email and the configuration files and send them to the listener which signed up.

The event will initiate that the platform provides an XML-file including data read out of the configuration data base to the webservice. At the webservice the XML-file is read and predefined routines are carried out, wherein the data of the XML-file are used. An example for such an XML-file is given in FIG. 8.

By the interpretation of this XML-file the email is created and the configuration file are created, wherein e.g. the correct URL is specified (CSPAT.cloud.grouplive.com). The configuration files are attached to the email. An example of the email is shown in figure . . . .

Figure 9:
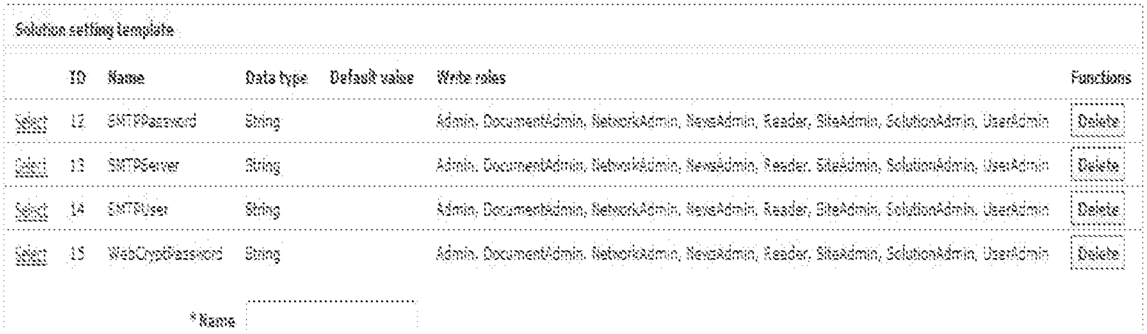
FIG. 9 shows a listing of solution setting templates which is a part of a platform configuration database.
Figure 10:
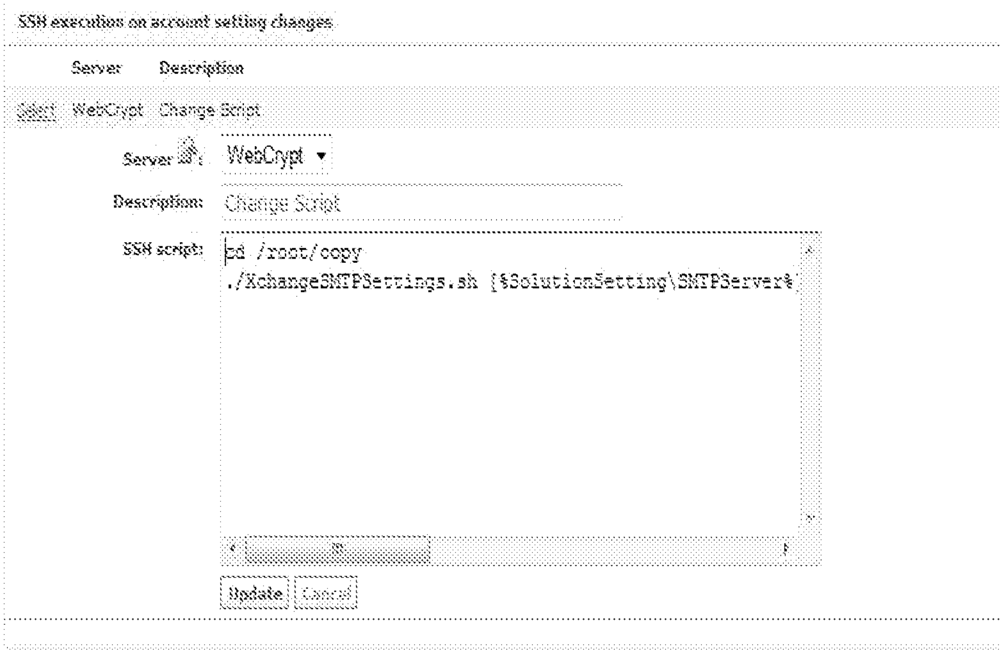
FIG. 10 shows an SSH script which is called to change the settings from FIG. 8.

The event system is furthermore used when the solution settings are changed by the user in the platform, particularly in the platform configuration database. Then the virtual server on which the WebCrypt Server is hosted is updated according to the platform configuration database by means of an SSH script. FIG. 9 shows solution setting templates which is a part of the platform configuration database and FIG. 10 shows an SSH script which is called to change the corresponding settings.

The ordinary software application WebCrypt is fairly complicated to install and setup, which typically requires external consultant to come in and install and configure an on premise system. This is not required when it is used on a platform according to the present invention, where a WebCrypt solution is registered.

Furthermore, WebCrypt requires a Linux operating system. The users of the IQ Suite System often have only a windows server and they do not often have the necessary internal Linux Competencies. Thus it is often not possible for them to install the ordinary WebCrypt.

With the platform according to the present examples they just have to subscribe the WebCrypt solution. The needed environment is provided fully automatically, wherein it is secured that for each listener a separate virtual server is provided so that each listener can use the software application WebCrypt completely independent of a further listener who is also using the software application WebCrypt on the same platform. This is particularly important for a software application like WebCrypt, which is designed to encrypt confidential emails.

The platform operating system comprises a load balancing routine. By this load balancing routine all application servers 2 (physical servers) are monitored with respect to the computation load which is caused by the virtual server running on the physical servers. If there are redundant virtual servers on different physical servers then the instances and/or the virtual servers can be automatically started and stopped by the load balance routine for providing on each physical server a similar amount of computation load. It is even possible to shut down or start up automatically a physical server if more or less computational power is needed.

This load balancing routine can also use the above described process for automatically installing an instance thus if more computational power is needed an additional physical server is started up. Then a virtual server is automatically installed together with the corresponding instance and run on the newly started up physical server. By this it is possible to automatically duplicate and/or move virtual servers in the platform so that only the amount of hardware is run which is needed.

This load balancing routine provides a significant saving with respect to electrical power consumption as the number of physical servers can always be kept as low as possible.

REFERENCE SIGNS

1 platform
2 application server
3 control server
4 data line
5 switch
6 firewall server
7 WAN
8 computer
9 platform configuration database
10 tables
11 installation file
12 server operating system
13 templates
14 server installation
15 operating system
16 instance
17 application data
18 computer environment
19 listener data line
20 user data line
21 web interface
22 control data line
23 data line
24 client computer for platform administrator While this invention has been particularly shown and described with references to preferred embodiments thereof, it will be understood by those skilled in the art that various changes in form and details may be made therein without departing from the scope of the invention encompassed by the appended claims.

What is claimed is:

1. A process for automatically installing a software application on a platform, wherein the platform comprises several servers including one or more application servers and a control server on which a platform configuration database is installed, the process comprising:

reading out configuration data and solution data from the platform configuration database after a predefined single tenant software application is selected by an user, wherein the configuration data describes the platform configuration and the solution data describes a solution of the selected single tenant software application which is registered on the platform;

determining, on a single physical server, a plurality of virtual servers to each simultaneously run the selected single tenant software application;

creating a separate private virtual network on the platform comprising a connection to an interface of the platform to a wide area network;

creating the determined virtual servers on the platform and connecting each of the virtual servers to said separate private virtual network;

installing an instance of the selected single tenant software application on each of the created virtual servers; and connecting each instance to said interface of the platform to provide an access for listeners to each instance, wherein the process is via Software as a Service (SaaS).

2. A process according to claim 1, wherein events are defined and each event is linked to a service, so that if such an event occurs the corresponding service is automatically carried out.

3. A process according to claim 2, wherein each event points by means of a pointer to one of the services, wherein the pointer is an URL and data of the platform configuration database are provided to the service by means of an XML-file.

4. A process according to the claim 3, wherein connecting the instance to an interface of the platform is done by automatically programming a firewall or a mail gateway.

5. A process according to claim 4, wherein an URL is automatically created for and assigned to each listener and registered in the firewall.

6. A process according to claim 5, wherein the computational load of the servers is automatically monitored by the platform operating system and in dependence of the monitored computational load on each individual physical server the physical servers are automatically shut down or started up.

7. A process according to claim 6, wherein in dependence of the monitored computational load on each individual physical server a virtual server and an instance in said virtual server are automatically installed or de-installed for balancing the computational loads between the several physical servers.

8. A process according to claim 1, wherein events are defined and each event is linked to a service, so that if such an event occurs the corresponding service is automatically carried out.

9. A process according to claim 8, wherein each event points by means of a pointer to one of the services, wherein the pointer is an URL and data of the platform configuration database are provided to the service by means of an XML-file.

10. A process according to the claim 1, wherein connecting the instance to an interface of the platform is done by automatically programming a firewall or a mail gateway.

11. A process according to claim 10, wherein an URL is automatically created for and assigned to each listener and registered in the firewall.

12. A process according to claim 1, wherein the computational load of the servers is automatically monitored by the platform operating system and in dependence of the monitored computational load on each individual physical server the physical servers are automatically shut down or started up.

13. A process according to claim 12, wherein in dependence of the monitored computational load on each individual physical server a virtual server and an instance in said virtual server are automatically installed or de-installed for balancing the computational loads between the several physical servers.

14. A platform operating system comprising: a platform configuration database and several routines for automatically installing a software application on a platform, wherein the platform comprises several physical servers including one or more application servers and a control server on which a platform configuration database is installed, wherein after a predefined single tenant software application is selected by an user, the single tenant software application is installed by: reading out configuration data and solution data from the platform configuration database wherein the configuration data describes the platform configuration and the solution data describes a solution of the selected single tenant software application which is registered on the platform, determining a plurality of virtual servers which are needed to simultaneously run the selected single tenant software application, creating a separate private virtual network on the platform comprising a connection to an interface of the platform to a wide area network, creating the determined plurality of virtual servers on one physical server of the platform and connecting the plurality of virtual servers to said separate private virtual network, installing an instance of the selected single tenant software application on each of the created plurality of virtual servers, and connecting the instance to said interface of the platform to provide an access via Software as a Service (SaaS) for listeners to the instance.

15. A platform comprising several servers including one or more application servers and a control server, wherein a platform operating system according to claim 14 is installed on the platform to control the platform.

16. A platform according to claim 15, wherein the platform comprises a firewall server on which a firewall is installed.

17. A platform according to claim 16, wherein the platform is connected to the Internet by means of said firewall server.

18. A platform according to claim 17, wherein the platform comprises a communication unit for carrying out the communication between the user and the platform and in which certain functions are defined and the user can only call these functions.

19. A platform according to claim 14, wherein the platform comprises a communication unit for carrying out the communication between the user and the platform and in which certain functions are defined and the user can only call these functions.

* * * * *